(12) United States Patent
Lugg et al.

(10) Patent No.: US 11,162,360 B2
(45) Date of Patent: Nov. 2, 2021

(54) MACHINE SUPPORTING ROCK CUTTING DEVICE

(71) Applicant: Joy Global Underground Mining LLC, Warrendale, PA (US)

(72) Inventors: Peter A. Lugg, Ferny Grove (AU); Geoffrey W. Keech, Wellington Point (AU); Stuart Reeves, North Wollongong (AU); Nagy Daher, New South Wales (AU)

(73) Assignee: JOY GLOBAL UNDERGROUND MINING LLC, Warrendale, PA (US)

( * ) Notice: Subject to any disclaimer, the term of this patent is extended or adjusted under 35 U.S.C. 154(b) by 0 days.

(21) Appl. No.: 16/780,607

(22) Filed: Feb. 3, 2020

(65) Prior Publication Data

US 2020/0173277 A1 Jun. 4, 2020

Related U.S. Application Data

(62) Division of application No. 15/712,452, filed on Sep. 22, 2017, now Pat. No. 10,550,693.

(Continued)

(51) Int. Cl.
*E21C 35/00* (2006.01)
*E21C 35/06* (2006.01)
(Continued)

(52) U.S. Cl.
CPC .............. *E21C 35/06* (2013.01); *E21B 44/02* (2013.01); *E21C 25/18* (2013.01); *E21C 25/68* (2013.01);
(Continued)

(58) Field of Classification Search
CPC ....................................................... E21C 35/06
See application file for complete search history.

(56) References Cited

U.S. PATENT DOCUMENTS

| | | |
|---|---|---|
| 1,093,787 A | 4/1914 | Kuhn et al. |
| 1,735,583 A | 11/1929 | Morgan |

(Continued)

FOREIGN PATENT DOCUMENTS

| | | |
|---|---|---|
| AU | 466244 B1 | 2/1972 |
| CA | 2141984 A1 | 8/1996 |

(Continued)

OTHER PUBLICATIONS

International Search Report and Written Opinion for Application No. PCT/US17/52884 dated Jan. 9, 2018 (16 pages).

(Continued)

*Primary Examiner* — Janine M Kreck
(74) *Attorney, Agent, or Firm* — Michael Best & Friedrich LLP

(57) ABSTRACT

A machine for excavating rock includes a frame, a cutting device, and a boom. The cutting device includes a cutting disc having a cutting edge, and the cutting disc is rotatable about a cutting device axis. The boom supports the cutting device and includes a first end, a second end, and a boom axis substantially parallel to the cutting device axis. The boom further includes a first portion and a second portion. The first portion is coupled to the frame for rotation about a first pivot axis between a raised position and a lowered position. The second portion is coupled to the cutting device, and the second portion is pivotable about a second pivot axis between a raised position and a lowered position.

13 Claims, 20 Drawing Sheets

Related U.S. Application Data

(60) Provisional application No. 62/398,744, filed on Sep. 23, 2016, provisional application No. 62/398,717, filed on Sep. 23, 2016, provisional application No. 62/398,834, filed on Sep. 23, 2016.

(51) Int. Cl.

| | | |
|---|---|---|
| *E21D 9/10* | (2006.01) | |
| *E21B 44/02* | (2006.01) | |
| *E21C 25/18* | (2006.01) | |
| *E21C 25/68* | (2006.01) | |
| *E21C 29/22* | (2006.01) | |
| *E21C 31/08* | (2006.01) | |

(52) U.S. Cl.
CPC .............. *E21C 29/22* (2013.01); *E21C 31/08* (2013.01); *E21C 35/00* (2013.01); *E21D 9/102* (2013.01); *E21D 9/1046* (2013.01)

(56) References Cited

U.S. PATENT DOCUMENTS

| | | |
|---|---|---|
| 1,953,326 A | 4/1934 | Morgan |
| 2,517,267 A | 8/1950 | Watson |
| 2,619,338 A | 11/1952 | Lindgren |
| 2,619,339 A | 11/1952 | Cartlidge |
| 2,654,586 A | 10/1953 | Berry |
| 2,659,585 A | 11/1953 | McCallum |
| 2,745,651 A | 5/1956 | Herrmann |
| 2,756,039 A | 7/1956 | Barrett |
| 2,776,823 A | 1/1957 | Barrett |
| 3,157,437 A | 11/1964 | Gonski |
| 3,197,256 A | 7/1965 | Hlinsky |
| 3,302,974 A | 2/1967 | Hlinsky |
| 3,306,663 A | 2/1967 | Webster |
| 3,353,871 A | 11/1967 | Arentzen |
| 3,355,215 A | 11/1967 | Haspert et al. |
| 3,408,109 A | 10/1968 | Lockwood |
| 3,412,816 A | 11/1968 | Lautsch |
| 3,446,535 A | 5/1969 | Lauber |
| 3,647,263 A | 3/1972 | Lauber et al. |
| 3,663,054 A | 5/1972 | Dubois |
| 3,729,056 A * | 4/1973 | Paurat .................. E21D 9/102 |
| | | 173/193 |
| 3,719,404 A | 6/1973 | Sterner |
| 3,840,271 A | 10/1974 | Sugden |
| 3,922,017 A | 11/1975 | Cobb |
| 3,929,378 A | 12/1975 | Frenyo et al. |
| 3,972,571 A | 8/1976 | Benkowski |
| 3,995,907 A | 12/1976 | Dubois |
| 4,005,905 A | 2/1977 | Dubois |
| 4,087,131 A | 5/1978 | Peterson et al. |
| 4,108,494 A | 8/1978 | Kogler |
| 4,230,372 A | 10/1980 | Marten |
| 4,248,481 A | 2/1981 | Stoltefuss |
| 4,273,383 A | 6/1981 | Grisebach |
| 4,302,054 A | 11/1981 | Haskew et al. |
| 4,377,311 A | 3/1983 | Seller |
| 4,470,635 A | 9/1984 | Paurat et al. |
| 4,516,807 A | 5/1985 | Eagles |
| 4,548,442 A * | 10/1985 | Sugden .................. E21D 9/1093 |
| | | 299/10 |
| 4,589,701 A | 5/1986 | Beckmann et al. |
| 4,643,483 A | 2/1987 | Brooks et al. |
| 4,647,112 A | 3/1987 | Demoulin et al. |
| 4,662,684 A | 5/1987 | Marten |
| 4,682,819 A | 7/1987 | Masse |
| 4,741,577 A | 5/1988 | Sato et al. |
| 4,755,002 A | 7/1988 | Parrott |
| 4,760,513 A | 7/1988 | Edwards |
| 4,796,713 A | 1/1989 | Bechem |
| 4,838,614 A | 6/1989 | Pentith et al. |
| 4,838,615 A | 6/1989 | Oldham |
| 4,848,486 A | 7/1989 | Bodine |
| 4,878,714 A | 11/1989 | Barnthaler et al. |
| 4,968,098 A | 11/1990 | Hirsch et al. |
| 5,028,092 A | 7/1991 | Coski |
| 5,050,934 A * | 9/1991 | Brandl .................. E21D 20/003 |
| | | 299/33 |
| 5,087,102 A | 2/1992 | Kiefer |
| 5,112,111 A | 5/1992 | Addington et al. |
| 5,190,353 A | 3/1993 | Bechem |
| 5,205,612 A | 4/1993 | Sugden et al. |
| 5,210,997 A | 5/1993 | Mountcastle, Jr. |
| 5,234,257 A * | 8/1993 | Sugden .................. E21D 9/1013 |
| | | 299/10 |
| 5,601,153 A | 2/1997 | Ensminger et al. |
| 5,676,125 A | 10/1997 | Kelly et al. |
| 5,697,733 A | 12/1997 | Marsh |
| 5,938,288 A | 8/1999 | Saint-Pierre et al. |
| 6,086,257 A | 7/2000 | Lee |
| 6,561,590 B2 | 5/2003 | Sugden |
| 6,857,706 B2 | 2/2005 | Hames et al. |
| 6,938,702 B2 | 9/2005 | Saha et al. |
| 7,182,407 B1 | 2/2007 | Peach et al. |
| 7,325,882 B2 | 2/2008 | Sugden et al. |
| 7,384,104 B2 | 6/2008 | Sugden |
| 7,431,402 B2 | 10/2008 | Peach et al. |
| 7,490,911 B2 | 2/2009 | Steinberg et al. |
| 7,695,071 B2 | 4/2010 | Jackson et al. |
| 7,731,298 B2 | 6/2010 | Merten et al. |
| 7,934,776 B2 | 5/2011 | de Andrade et al. |
| 7,954,735 B2 | 6/2011 | Belotserkovsky |
| 8,079,647 B2 | 12/2011 | Yao et al. |
| 8,276,991 B2 | 10/2012 | Thomson |
| 8,328,292 B2 | 12/2012 | de Andrade et al. |
| 8,636,324 B2 | 1/2014 | Skea |
| 8,690,262 B2 | 4/2014 | Ebner et al. |
| 8,727,450 B2 | 5/2014 | de Andrade et al. |
| 9,470,087 B2 | 10/2016 | Smith et al. |
| 2002/0093239 A1 | 7/2002 | Sugden |
| 2005/0200192 A1 | 9/2005 | Sugden et al. |
| 2007/0090678 A1 | 4/2007 | Peach et al. |
| 2007/0193810 A1 | 8/2007 | Steinberg et al. |
| 2008/0156531 A1 | 7/2008 | Boone et al. |
| 2009/0058172 A1 | 3/2009 | DeAndrade et al. |
| 2009/0066148 A1 | 3/2009 | Willison |
| 2009/0127918 A1 | 5/2009 | Yao et al. |
| 2010/0019563 A1 | 1/2010 | Thomson |
| 2010/0260563 A1 | 10/2010 | Conroy et al. |
| 2011/0062768 A1 | 3/2011 | Van Zyl et al. |
| 2011/0181097 A1 | 7/2011 | Skea |
| 2012/0098325 A1 | 4/2012 | Junker et al. |
| 2013/0057044 A1 | 3/2013 | De Andrade et al. |
| 2014/0077578 A1 | 3/2014 | Smith et al. |
| 2014/0091612 A1 | 4/2014 | Rowher et al. |
| 2014/0178155 A1 | 6/2014 | Feasey |
| 2015/0152728 A1 | 6/2015 | Hartwig et al. |
| 2017/0204666 A1 | 7/2017 | Galler et al. |
| 2018/0051561 A1 | 2/2018 | Daher et al. |
| 2018/0051562 A1 | 2/2018 | Daher et al. |

FOREIGN PATENT DOCUMENTS

| | | |
|---|---|---|
| CL | 35975 | 2/1988 |
| CL | 199600179 | 9/1996 |
| CL | 200901978 | 2/2010 |
| CN | 101778998 A | 7/2010 |
| CN | 101828004 A | 9/2010 |
| CN | 102061914 A | 5/2011 |
| CN | 102305067 A | 1/2012 |
| CN | 102513998 A | 6/2012 |
| CN | 102587911 A | 7/2012 |
| CN | 102606154 A | 7/2012 |
| CN | 102704927 B | 10/2012 |
| CN | 102733803 A | 10/2012 |
| CN | 202500560 U | 10/2012 |
| CN | 202991028 U | 6/2013 |
| CN | 103206213 A | 7/2013 |
| CN | 103498671 A | 1/2014 |
| CN | 104047603 A | 9/2014 |
| CN | 104500086 A | 4/2015 |
| CN | 204283458 U | 4/2015 |

(56) References Cited

FOREIGN PATENT DOCUMENTS

| | | | |
|---|---|---|---|
| DE | 4123307 C1 | 12/1992 | |
| DE | 4440261 A1 | 5/1996 | |
| DE | 19900906 A1 | 7/2000 | |
| EP | 0176234 A1 | 4/1986 | |
| EP | 0329915 A1 | 8/1989 | |
| GB | 2214963 A * | 9/1989 | ......... E21D 23/0427 |
| JP | S5540058 U | 3/1980 | |
| JP | H02147793 A | 6/1990 | |
| RU | 2044125 C1 | 9/1995 | |
| RU | 2142561 C1 | 12/1999 | |
| RU | 2187640 C1 | 8/2002 | |
| RU | 2209979 C2 | 8/2003 | |
| RU | 2276728 C1 | 5/2006 | |
| RU | 2441155 C1 | 1/2012 | |
| SU | 323552 A | 11/1972 | |
| SU | 514097 A1 | 5/1976 | |
| SU | 581263 A1 | 11/1977 | |
| SU | 619117 A3 | 8/1978 | |
| SU | 750061 A1 | 7/1980 | |
| SU | 804832 A1 | 2/1981 | |
| SU | 962626 A1 | 9/1982 | |
| SU | 1328521 A1 | 8/1987 | |
| SU | 1712599 A1 | 2/1992 | |
| SU | 1731946 A1 | 5/1992 | |
| SU | 1744249 A1 | 6/1992 | |
| SU | 1779278 C | 11/1992 | |
| WO | 0043637 A1 | 7/2000 | |
| WO | 0046486 A1 | 8/2000 | |
| WO | 0201045 A1 | 1/2002 | |
| WO | 02066793 A1 | 8/2002 | |
| WO | 2003062587 A1 | 7/2003 | |
| WO | 03089761 A1 | 10/2003 | |
| WO | 2012156843 A2 | 9/2005 | |
| WO | 2006075910 A1 | 7/2006 | |
| WO | 2016055087 A1 | 4/2016 | |

OTHER PUBLICATIONS

International Mining, "DynaCut Technology Achieving Breakthroughs," <https://im-mining.com/2015/12/17/dynacut-technology-achieving-breakthroughs/> web page accessed Nov. 22, 2019.

Mining3 Mining, "CRCMining Joy Global Oscillating Disc Cutter (ODC) Hard Rock Cutting Machine," <https://www.youtube.com/watch?v=anyPQWkH4rM> web page accessed Oct. 24, 2019.

Chilean Patent Office Search Report and Examiner's Report for Application No. 201900744 dated Feb. 3, 2020 (19 pages including statement of relevance).

Extended European Search Report for Application No. 17853961.5 dated Mar. 19, 2020 (7 pages).

Chinese Patent Office Action for Application No. 201780070961.1 dated Jul. 2, 2020 (11 pages including English summary).

Chilean Patent Office Search Report and Examiner's Report for Application No. 201900744 dated Aug. 14, 2020 (22 pages including statement of relevance).

Russian Patent Office Action for Application No. 2019112098 dated Nov. 16, 2020 (16 pages including English translation).

Chinese Patent Office Action for Application No. 201780070961.1 dated Feb. 26, 2021 (6 pages including English summary).

Chilean Patent Office Action and Search Report for Application No. 202002006 dated Jul. 13, 2021 (25 pages ncluding statement of relevance).

* cited by examiner

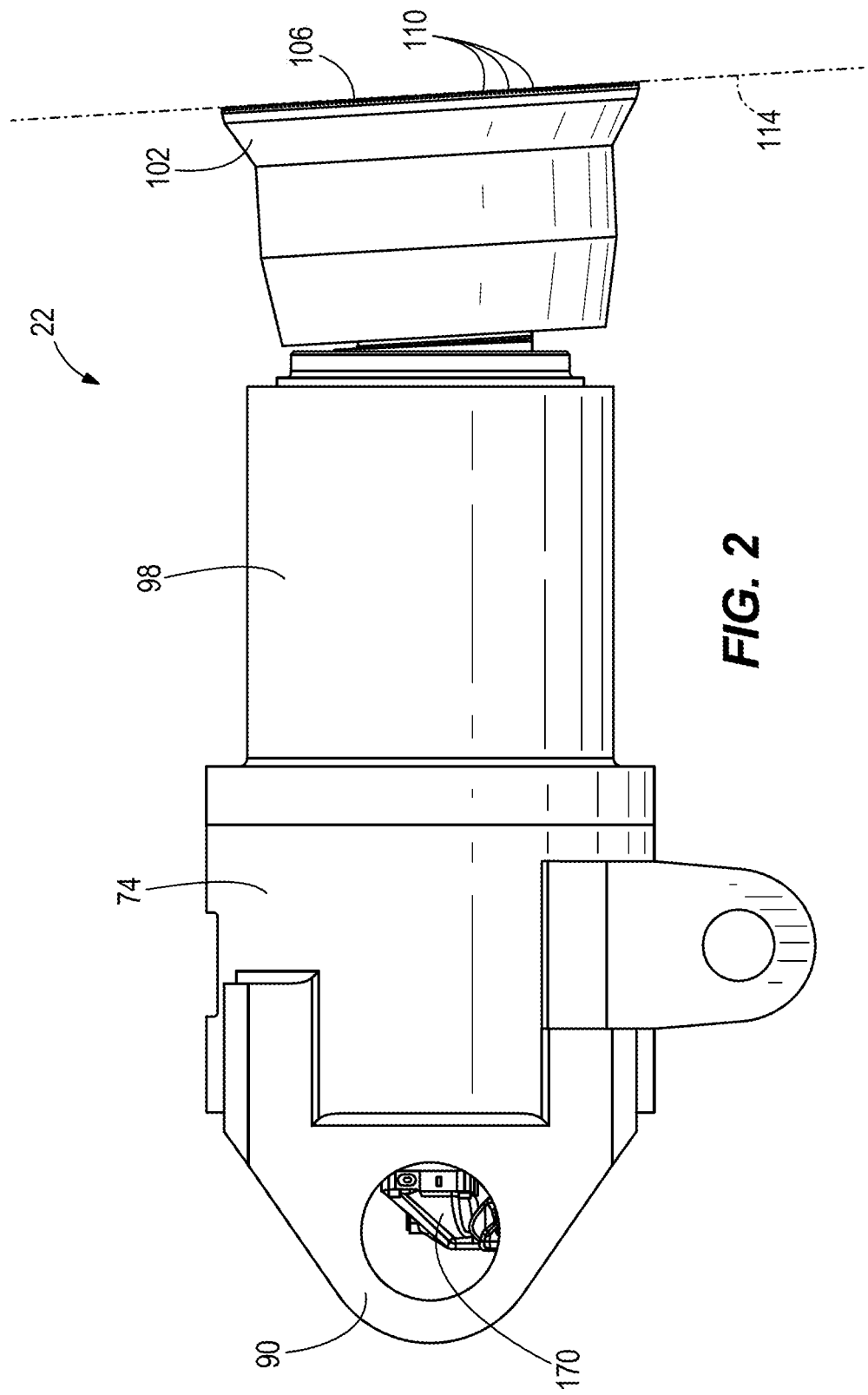

MACHINE SUPPORTING ROCK CUTTING DEVICE

CROSS-REFERENCE TO RELATED APPLICATIONS

This application is a divisional of prior-filed, co-pending U.S. patent application Ser. No. 15/712,452, filed Sep. 22, 2017, which claims the benefit of U.S. Provisional Patent Application No. 62/398,744, filed Sep. 23, 2016, U.S. Provisional Patent Application No. 62/398,717, filed Sep. 23, 2016, and U.S. Provisional Patent Application No. 62/398,834, filed Sep. 23, 2016. The entire contents of these documents are incorporated by reference herein.

BACKGROUND

The present disclosure relates to mining and excavation machines, and in particular to a cutting device for a mining or excavation machine.

Hard rock mining and excavation typically requires imparting large energy on a portion of a rock face in order to induce fracturing of the rock. One conventional technique includes operating a cutting head having multiple mining picks. Due to the hardness of the rock, the picks must be replaced frequently, resulting in extensive down time of the machine and mining operation. Another technique includes drilling multiple holes into a rock face, inserting explosive devices into the holes, and detonating the devices. The explosive forces fracture the rock, and the rock remains are then removed and the rock face is prepared for another drilling operation. This technique is time-consuming and exposes operators to significant risk of injury due to the use of explosives and the weakening of the surrounding rock structure. Yet another technique utilizes roller cutting element(s) that rolls or rotates about an axis that is parallel to the rock face, imparting large forces onto the rock to cause fracturing.

SUMMARY

In one aspect, a machine for excavating rock includes a frame, a cutting device, and a boom. The cutting device includes a cutting disc having a cutting edge, and the cutting disc is rotatable about a cutting device axis. The boom supports the cutting device and includes a first end, a second end, and a boom axis substantially parallel to the cutting device axis. The boom further includes a first portion and a second portion. The first portion is coupled to the frame for rotation about a first pivot axis between a raised position and a lowered position. The second portion is coupled to the cutting device, and the second portion is pivotable about a second pivot axis between a raised position and a lowered position.

In another aspect, a machine for excavating rock includes a chassis, a boom supported by the chassis, a cutting device supported by the boom, and a stabilizer. The chassis includes at least one traction drive device. The cutting device includes a cutting disc having a cutting edge, and the cutting disc is rotatable about a cutting device axis. The stabilizer supports the chassis relative to a mine surface. The stabilizer includes a pad, an actuator, and a support member. The pad is configured to engage the mine surface, and the actuator includes a first end coupled to the chassis and a second end coupled to the pad. The support member includes a first end coupled to the chassis and a second end coupled to at least one of the pad and the actuator.

Other aspects will become apparent by consideration of the detailed description and accompanying drawings.

BRIEF DESCRIPTION OF THE DRAWINGS

FIG. 2 is a side view of a cutter head.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, aspects of the invention may be implemented in software (for example, stored on non-transitory computer-readable medium) executable by one or more processing units, such as a microprocessor, an application specific integrated circuits ("ASICs"), or another electronic device. As such, it should be noted that a plurality of hardware and software based devices, as well as a plurality of different structural components may be utilized to implement the invention. For example, "controllers" described in the specification may include one or more electronic processors or processing units, one or more computer-readable medium modules, one or more input/output interfaces, and various connections (for example, a system bus) connecting the components.

Figure 1A:
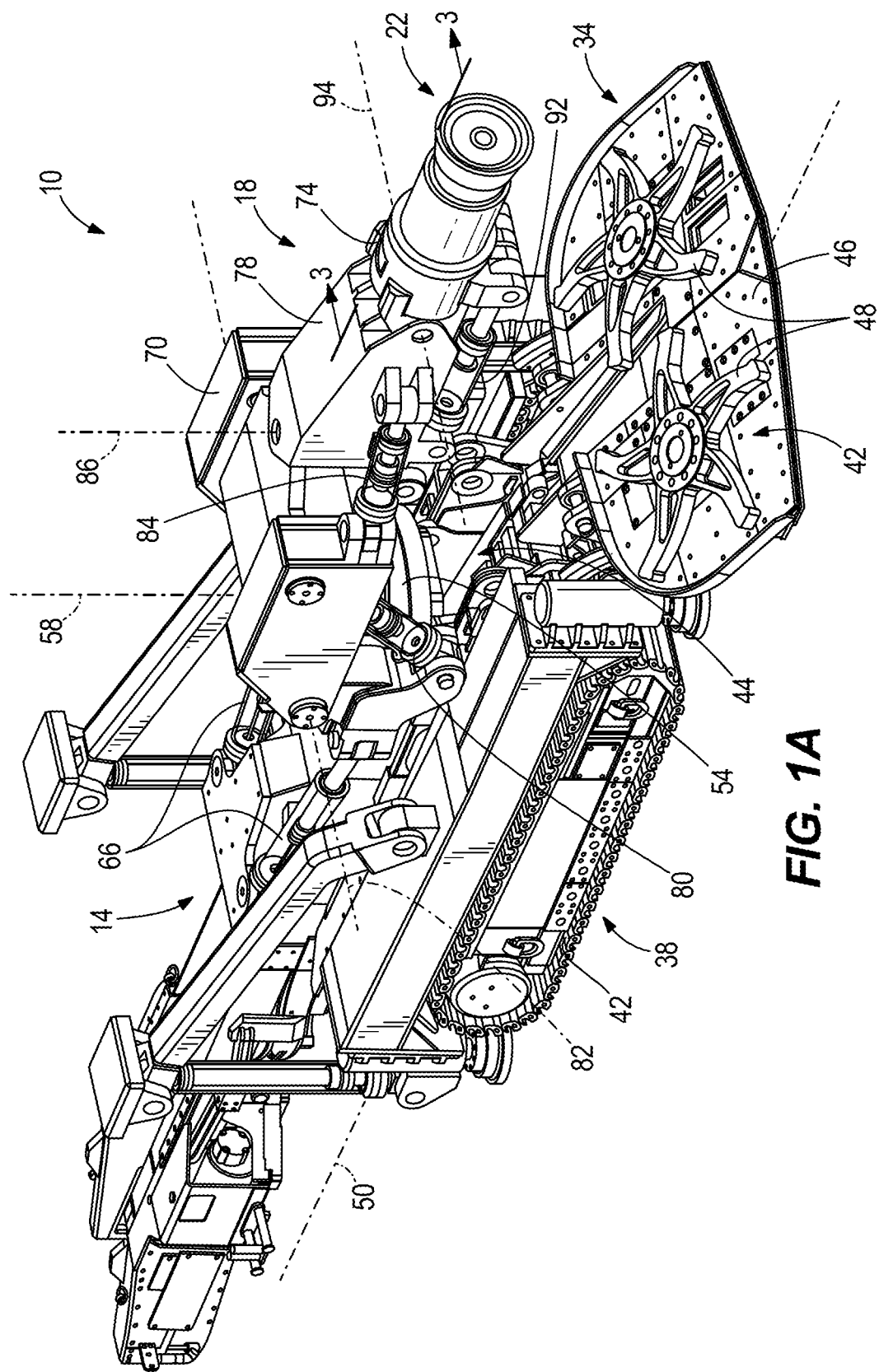
FIG. 1A is a perspective view of a mining machine.

FIG. 1A illustrates a rock excavating machine or mining machine 10 (e.g., an entry development machine) including a chassis 14, a boom 18, a rock excavating device or cutting device or cutter head 22 for engaging a rock face 30 (FIG. 1G), and a material handling system 34. In the illustrated embodiment, the chassis 14 is supported on a traction drive device (e.g., a crawler 38) for movement relative to a floor (not shown). In the illustrated embodiment, the crawler 38 includes a roller-type crawler track 42 to distribute machine weight and minimize traction power and wear. Rollers along the lower run of the crawler track 42 develop lower resistive forces and support the machine 10 as it moves. In some embodiments, the crawler 38 may be controlled to move the machine 10 at travel speeds from to approximately 20 meters per minute. In other embodiments, the crawler 38 may move the machine at lower or higher speeds. The chassis 14 includes a first or forward end and a second or rear end, and a longitudinal chassis axis 50 extends between the forward end and the rear end.

In the illustrated embodiment, the boom 18 is supported on a turret or turntable or swivel joint 54 for pivoting relative to the chassis 14. The swivel joint 54 is supported for rotation (e.g., by a slew bearing, not shown) about a swivel axis 58 that is perpendicular to the chassis axis 50 (e.g., the swivel axis 58 is perpendicular to the support surface) to pivot the boom 18 in a plane that is generally parallel the chassis axis 50 (e.g., a plane parallel to the support surface). In the illustrated embodiment, slew actuators or cylinders 66 extend and retract to pivot the swivel joint 54 and the boom 18 about the swivel axis 58.

Figure 1B:
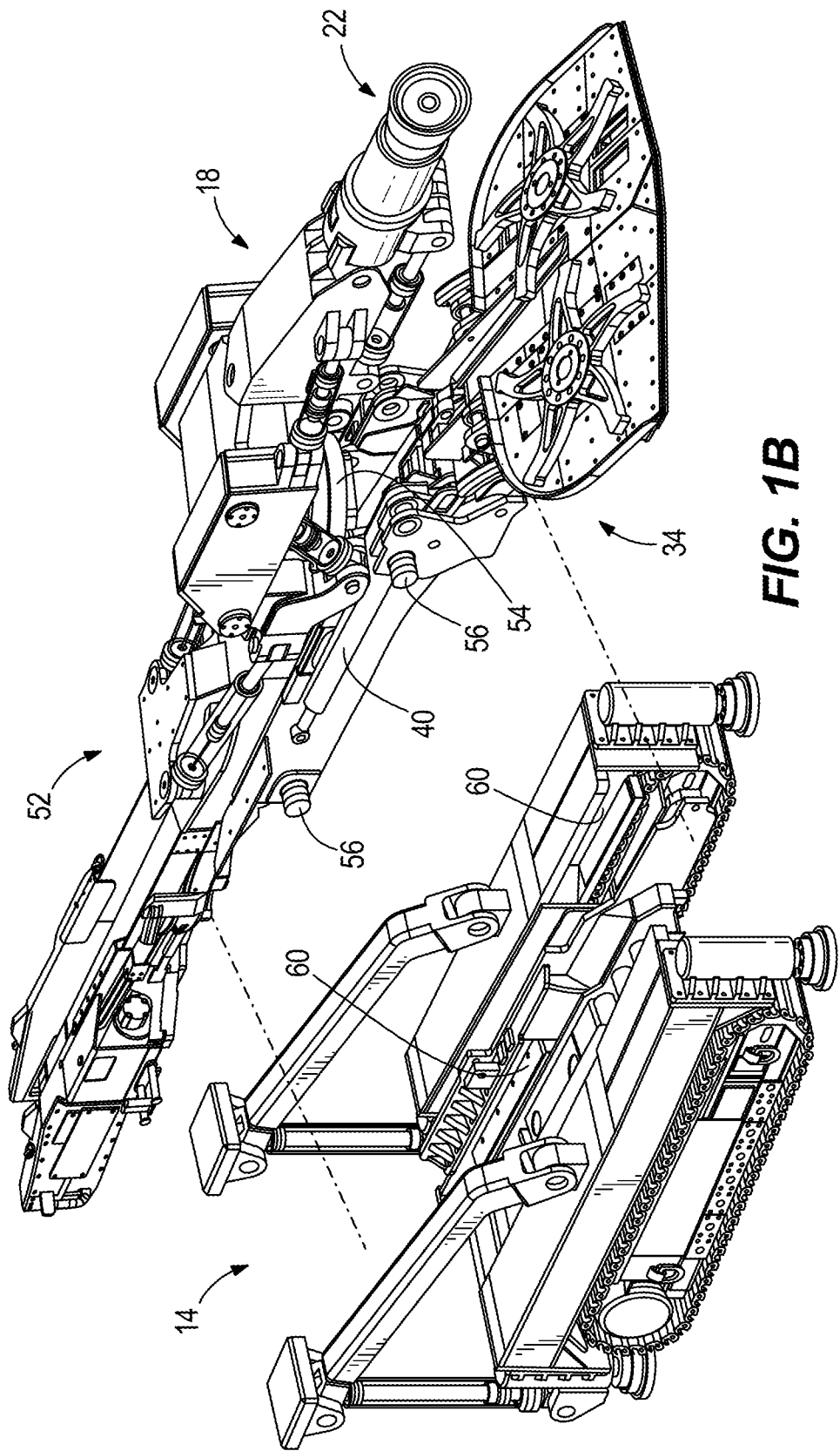
FIG. 1B is a perspective view of a chassis and a sumping frame of the mining machine of FIG. 1A.

As shown in FIG. 1B, the swivel joint 54, the boom 18, the cutter head 22, and the material handling system 34 are supported on a common sumping frame 52 that is movable relative to the chassis 14. In the illustrated embodiment, the sumping frame 52 includes laterally extending projections 56 that are received within slots 60 of the chassis 14. The projections 56 may move (e.g., roll or slide) within the slots 60, and fluid actuators (e.g., cylinders 40) are coupled between the chassis 14 and the sumping frame 52 to move the sumping frame 52. In other embodiments, the movement of the sumping frame 52 may be accomplished in another manner. Movement of the sumping frame 52 permits the cutter head 22 and material handling system 34 to be moved parallel to the chassis axis 50 and advanced toward the rock face 30 while the chassis 14 remains secured in position relative to the ground. In some embodiments, the sumping frame 52 permits the cutter head 22 to advance a total of 1 meter relative to the chassis 14 before the chassis 14 must be advanced/re-positioned; in other embodiments, the total sumping distance may be greater or less. In some embodiments, retracting the sumping frame 52 while the machine 10 is moving on the crawlers 38 provides a favorable center of gravity for travel activities.

Supporting the swivel joint 54 on the sumping frame 52 reduces the need for additional auxiliary components and support structure behind the boom 18, which may be required with other types of boom configurations. Accordingly, electric and hydraulic motors, pumps, valves, and conduits can be directly supported on the boom 18, providing a simpler, compact, and more reliable machine.

Figure 1C:
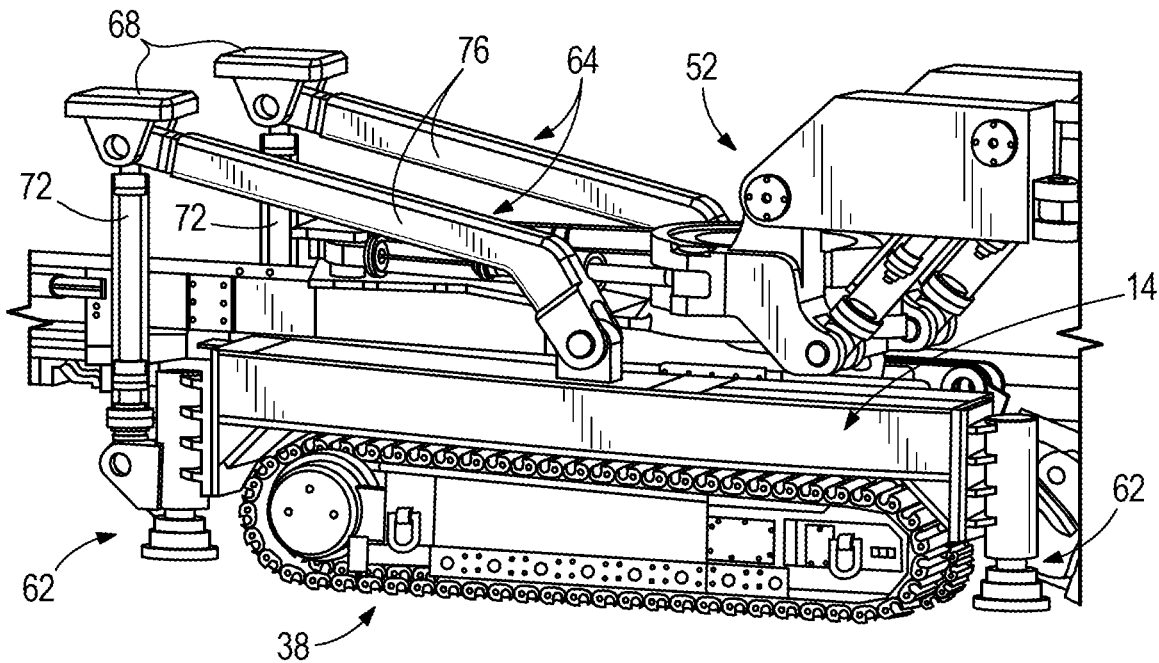
FIG. 1C is a perspective view of the mining machine of FIG. 1A with stabilizers in a first position.
Figure 1D:
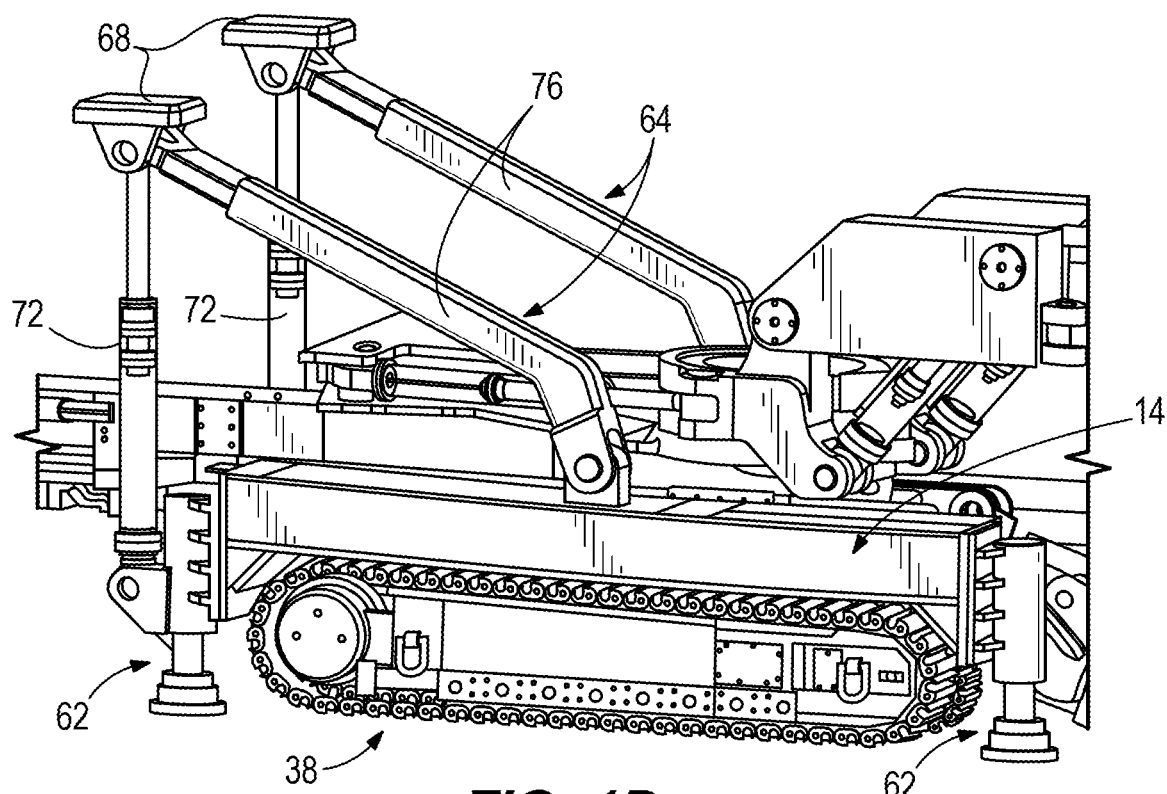
FIG. 1D is a perspective view of the mining machine of FIG. 1A with stabilizers in a second position.

As shown in FIGS. 1C and 1D, stabilization devices are coupled to the chassis 14 to selectively secure the chassis 14 with respect to a mine surface (e.g., a mine floor or mine roof). The stabilization devices can lift the chassis 14 to unload the crawlers 38 and hold the chassis 14 generally steady during cutting operations, thereby supporting the chassis 14 against the loads caused by the application of cutting forces by the cutter head 22 (FIG. 1A). In the illustrated embodiment, the stabilization devices include jacks 62 and stabilizers 64. The jacks 62 extend downwardly from the chassis 14 to engage a support surface or floor, and the jack 62 are positioned adjacent each of the four corners of the chassis 14. The jacks 62 may be independently actuated to level the chassis 14 or position it at a desired orientation. In other embodiments, the jacks may extend in a different direction, and fewer or more jacks 62 may be coupled to the chassis 14.

The stabilizers 64 extend upwardly from the chassis 14 to engage a roof or hanging wall surface. Each stabilizer 64 includes a pad 68 for engaging the surface, a fluid cylinder 72, and a support link or brace 76. The fluid cylinder 72 includes one end pivotably coupled to the pad 68 and another end pivotably coupled to the chassis 14. The brace 76 includes one end pivotably coupled to the pad 68 and the one end of the fluid cylinder 72, and another end pivotably coupled to the chassis 14. In the illustrated embodiment, each brace 76 is telescoping and can extend in length as the fluid cylinder 72 raises the pad 68. Abnormalities or defects in the roof surface can be avoided by adjusting the length of the telescoping brace 76 before the pad 68 is loaded against the surface. Actuation of the fluid cylinder 72 causes the associated pad 68 to engage and exert a load against the roof surface, thereby increasing the reaction loads exerted by the jacks 62 in the opposite direction (against the floor). The brace 76 provides stability and distributes a portion of the reaction force to another portion of the chassis 14.

Figure 1E:
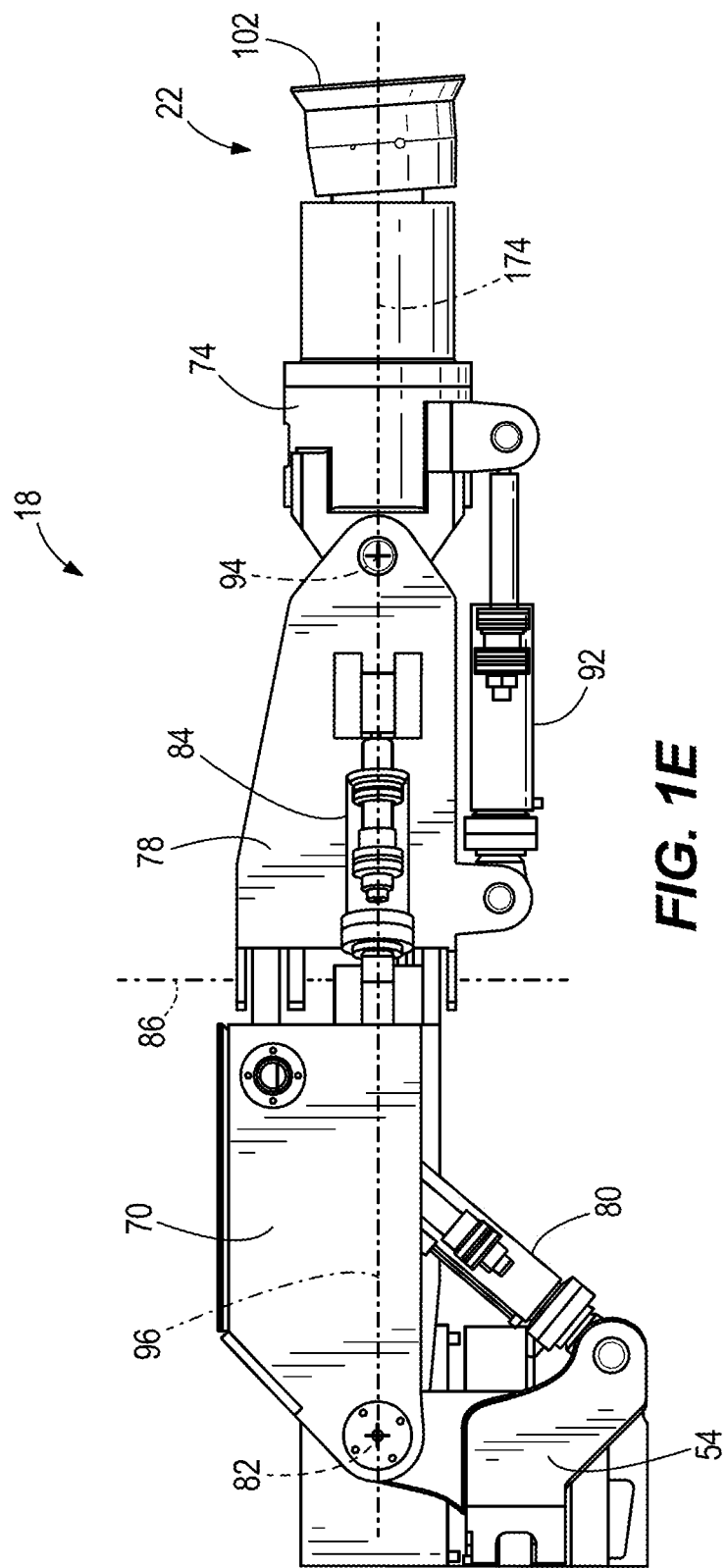
FIG. 1E is a side view of a boom and cutter head.
Figure 1F:
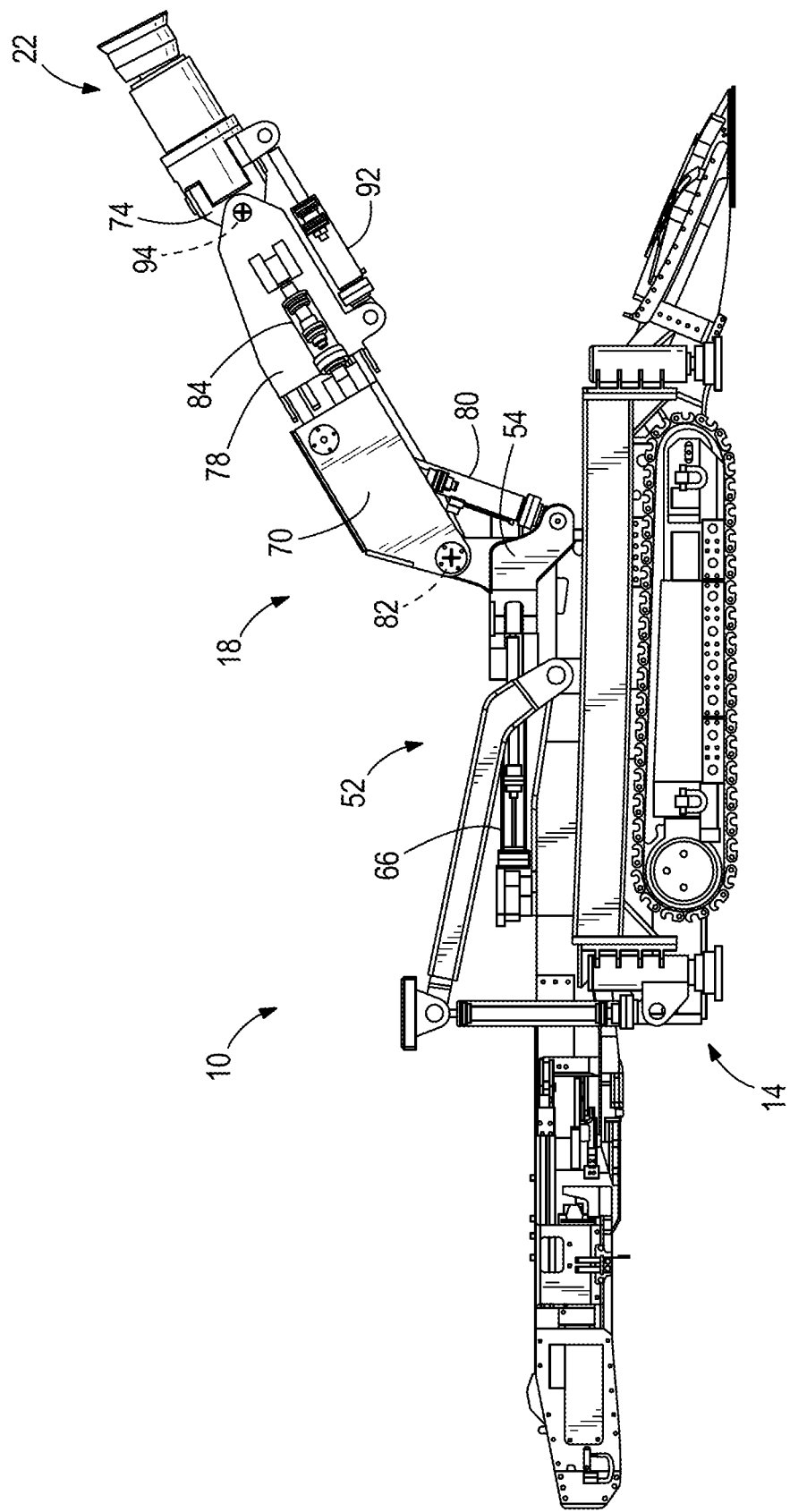
FIG. 1F is a side view of the mining machine of FIG. 1A with a boom in a raised position.
Figure 1G:
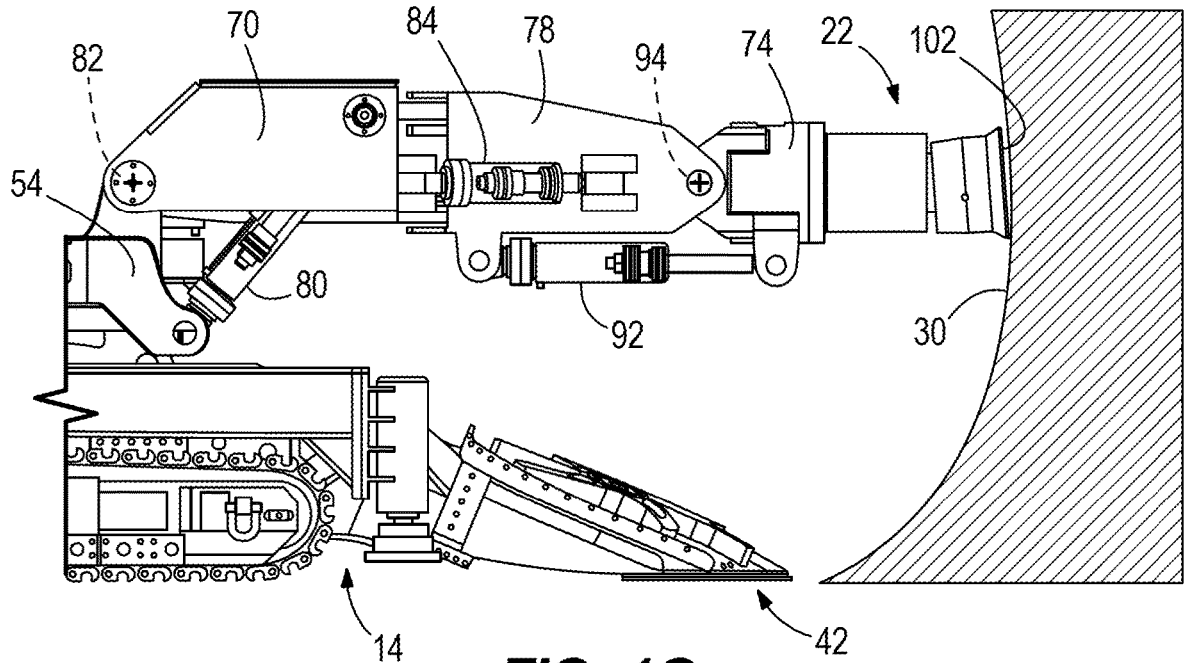
FIG. 1G is a side view of the mining machine of FIG. 1A with the boom in an aligned position.
Figure 1H:
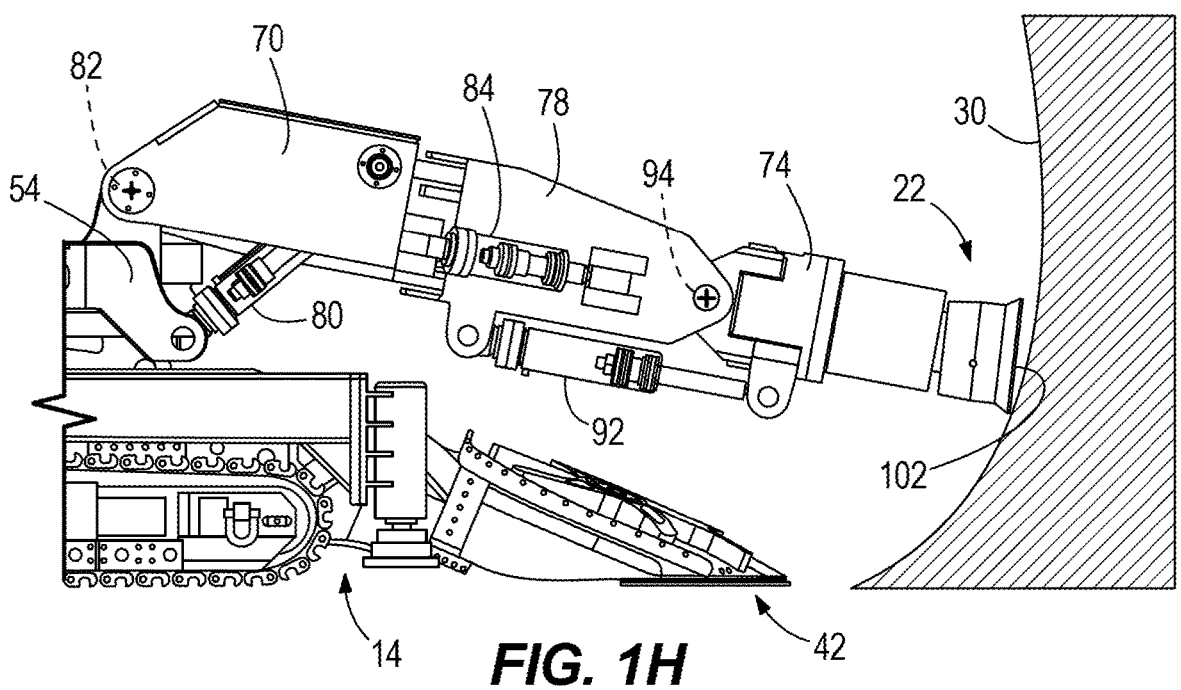
FIG. 1H is a side view of the mining machine of FIG. 1A with the boom in a lowered position.
Figure 1I:
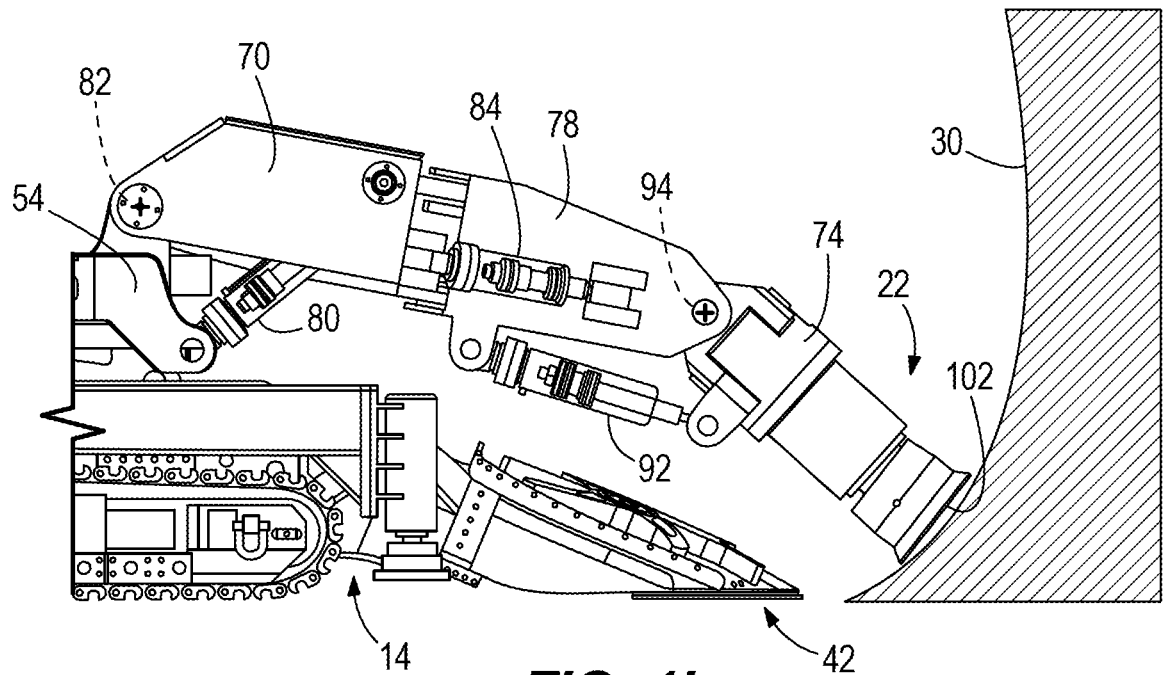
FIG. 1I is a side view of the mining machine of FIG. 1A with a wrist portion in a first lower position.
Figure 1J:
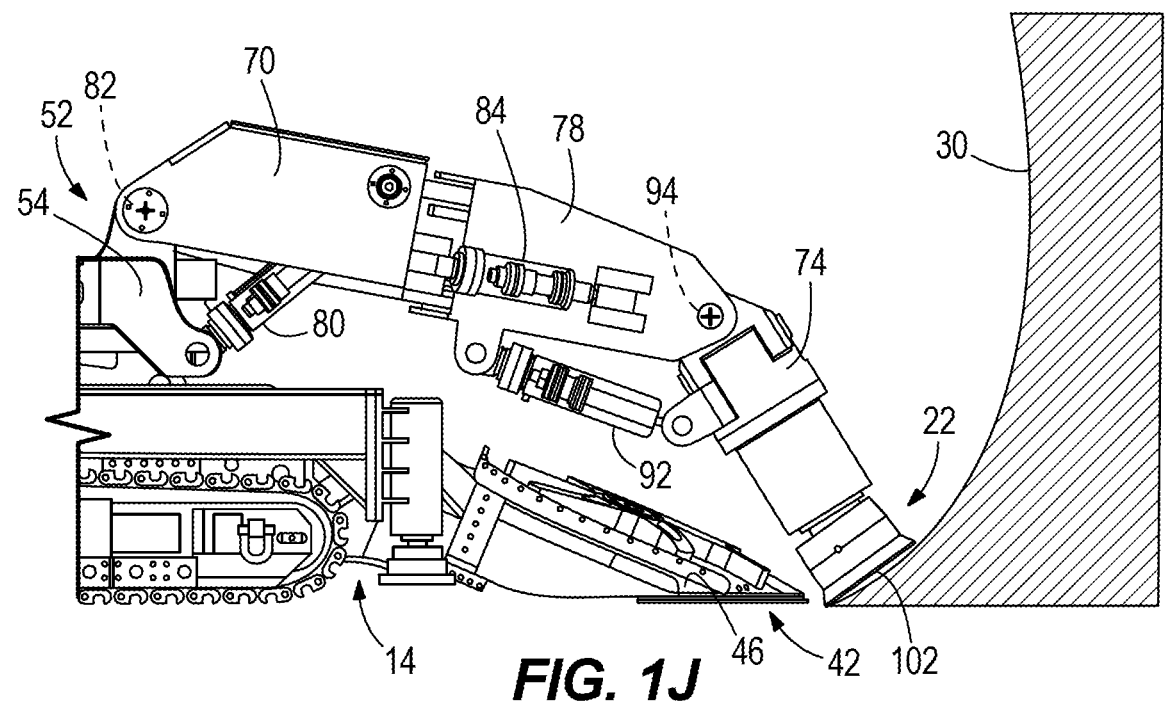
FIG. 1J is a side view of the mining machine of FIG. 1A with the wrist portion in a second lower position.
Figure 1K:
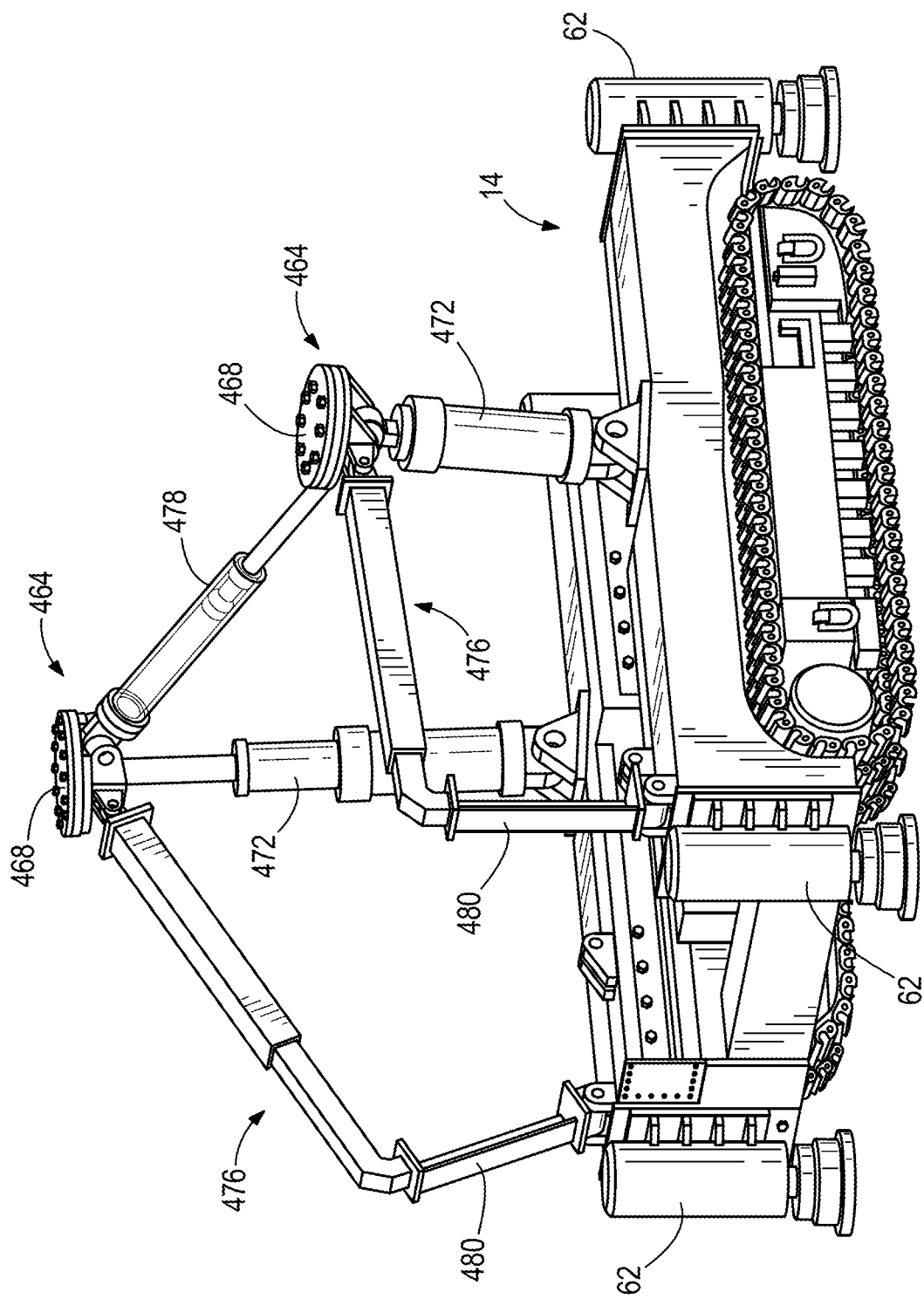
FIG. 1K is a perspective view of a chassis with stabilizers according to another embodiment.

Referring now to FIG. 1K, in another embodiment, a lower end of the fluid cylinder 472 is pivotably coupled to the chassis 14 in a different location, thereby providing a desired sharing of the stabilizing load configuration with the jacks 62. In addition, a telescoping link or cross-member 478 (e.g., a fluid cylinder) is coupled between the pads 468 of the stabilizers 464 to prevent lateral movement of the pads 468 while the pads 468 are loaded against the mine surface. Furthermore, each brace 476 may be pivotably coupled to the associated pad 468 by a spherical coupling, and the cross-member 478 may be pivotably coupled to the pads 468 and the braces 476 by spherical couplings. Each brace 476 can include a torsionally flexible portion 480 (e.g., to permit a predetermined range of twisting movement of the brace 476). The stabilizers 464 can be independent actuated to engage the roof surface, even if the surface is uneven.

In operation, the crawlers 38 move the machine 10 to a desired position, and the jacks 62 and stabilizers 64 are actuated to level the chassis 14 and clamp or secure the machine against the floor and/or roof. The sumping frame 52 may be advanced or sumped (e.g., by the cylinders 40) in a direction parallel to the chassis axis 50 (FIG. 1), toward the rock wall or formation. After each cutting pass, the sumping frame 52 can be advanced by a distance approximately equal to one depth of cut (e.g., 50 mm, 100 mm). The cutting loads may be transferred to the ground via the stabilization devices.

Referring again to FIG. 1A, the material handling system 34 includes a shovel or gathering head 42 and a conveyor 44. The gathering head 42 includes an apron or deck 46 and rotating arms 48. As the mining operation advances, the cut material is urged onto the deck 46, and the rotating arms 48 move the cut material onto the conveyor 44 for transporting the material to a rear end of the machine 10. In other embodiments, the arms may slide or wipe across a portion of the deck 46 (rather than rotating) to direct cut material onto the conveyor 44. The conveyor 44 may be a chain conveyor driven by one or more sprockets. In the illustrated embodiment, the conveyor 44 is coupled to the gathering head 42 and is supported for movement with the gathering head 42 relative to the chassis 14.

As shown in FIG. 1A, the boom 18 includes a first or base portion 70, a second or wrist portion 74 supporting the cutter head 22, and an intermediate portion 78 positioned between the base portion 70 and the wrist portion 74. In the illustrated embodiment, the base portion 70 is pivotably coupled to the swivel joint 54 (e.g., by a pin joint), and the base portion 70 is pivoted or "luffed" relative to the swivel joint 54 by first actuators 80 (e.g., fluid cylinders). The extension and retraction of the first actuators 80 pivot the base portion 70 about a luff axis or first pivot axis 82. The first pivot axis 82 may be transverse to the swivel axis 54 such that extension and retraction of the first actuators 80 causes the base portion 70 to move between an upper position and a lower position. In addition, the intermediate portion 78 is pivotably coupled to the base portion 70 (e.g., by a pin joint), and the intermediate portion 78 is pivoted relative to the base portion 70 by second actuators 84 (e.g., second fluid cylinders). The extension and retraction of the second actuators 84 pivots the intermediate portion 78 about a second pivot axis 86 offset from the first pivot axis 82. In the illustrated embodiment with the boom elements oriented as shown, the second pivot axis 86 is substantially perpendicular to the luff axis or first pivot axis 82.

In other embodiments (not shown), a base portion of the boom may instead be coupled to the frame and supported for pivoting movement about a lateral axis or luffing axis, and a swivel joint may be formed on a portion of the boom. It is understood that other embodiments may include various configurations of articulating portions for the boom.

Furthermore, the wrist portion 74 includes lugs 90 (FIG. 2) that are pivotably coupled to the intermediate portion 78 (e.g., by a pin joint). The wrist portion 74 is pivoted relative to the intermediate portion 78 by wrist actuators 92 (e.g., fluid cylinders). The extension and retraction of the wrist actuators 92 pivots the wrist portion 74 about a wrist axis 94 offset from the first pivot axis 82 and the second pivot axis 86. In the illustrated embodiment, the second pivot axis 86 is substantially perpendicular to the first pivot axis 82 and is substantially perpendicular to the wrist axis 94.

As shown in FIGS. 1E-1H, in some embodiments, the boom 18 can be positioned to align the base portion 70, the intermediate portion 78, and the wrist portion 74. The boom 18 can remain in this aligned or straight configuration for a significant portion of the cutting operation, and the cutter head 22 position may be primarily controlled by actuation of the slew actuators 66 (FIG. 1F) and the luff actuators 80. As shown in FIGS. 1I and 1J, when cutting below a lower limit of the straight boom configuration, a luff angle (i.e., the orientation of the base portion 70 relative to the swivel joint 54) can be kept at its lower limit while the wrist portion 74 is articulated or luffed by the wrist actuators 92. In some embodiments, the wrist portion 74 can be articulated or luffed even when the base portion 70 is above the lower limit of the straight boom configuration. In some embodiments, the base portion 70 may be pivoted about the first pivot axis 82 between approximately 11 degrees below horizontal and approximately 35 degrees above horizontal. In some embodiments, the wrist portion 74 may be pivoted relative to the intermediate portion 78 about the wrist axis 94 up to approximately 50 degrees, providing a significant amount of further articulation.

As shown in FIG. 1E, in the illustrated embodiment, the first pivot axis 82 and the wrist axis 94 may be positioned along a straight line 96 aligned with the cutter head 22, thereby permitting a transition between cutting via actuation of the luff actuators 80 and cutting via actuation of the wrist actuators 92. In other embodiments, a combination of boom and wrist luffing control may be used. Also, the wrist portion 74 and intermediate portion 78 of the boom 18 and their associated actuators provide resiliency or a biasing function to act as a suspension mechanism during cutting. The actuators 80, 84, 92 may articulate the boom portions to provide a desired cutting profile, and may also act as springs to react to the cutting forces exerted on the boom 18.

As shown in FIG. 1J, in the illustrated embodiment, the distal wrist portion 74 may be angled downwardly to position the cutter head 22 proximate a floor while also drawing the cutting disc 102 close to the leading edge of the shovel 42. The lower surfaces of the boom 18 also maintain significant clearance relating to the shovel 42, aiding the flow of material across the shovel 42 and onto the conveyor 44 (FIG. 1A). A steep pivot angle for the wrist portion 74 and its close proximity between the cutting element and a leading edge of the shovel deck 46 facilitates loading cut material onto the deck 46. The steep pivot angle provides a face-to-floor profile that resembles a large radius fillet to prevent material from becoming jammed between the forward edge of the shovel 42 and the face 30. The floor may be undercut, for example, by further declining the base portion 70 and reducing the inclination of the wrist portion 74. The boom 18 is compact while also being highly versatile and articulatable to enable the cutter head 22 to penetrate previously cut material deposited on the floor in order to move the material away from the face 30 and clear the space. Also, because the shovel 42 and the boom 18 are both mounted on the sumping frame 52, the relative geometry between the components is maintained regardless of the position of the sumping frame 52.

Figure 3:
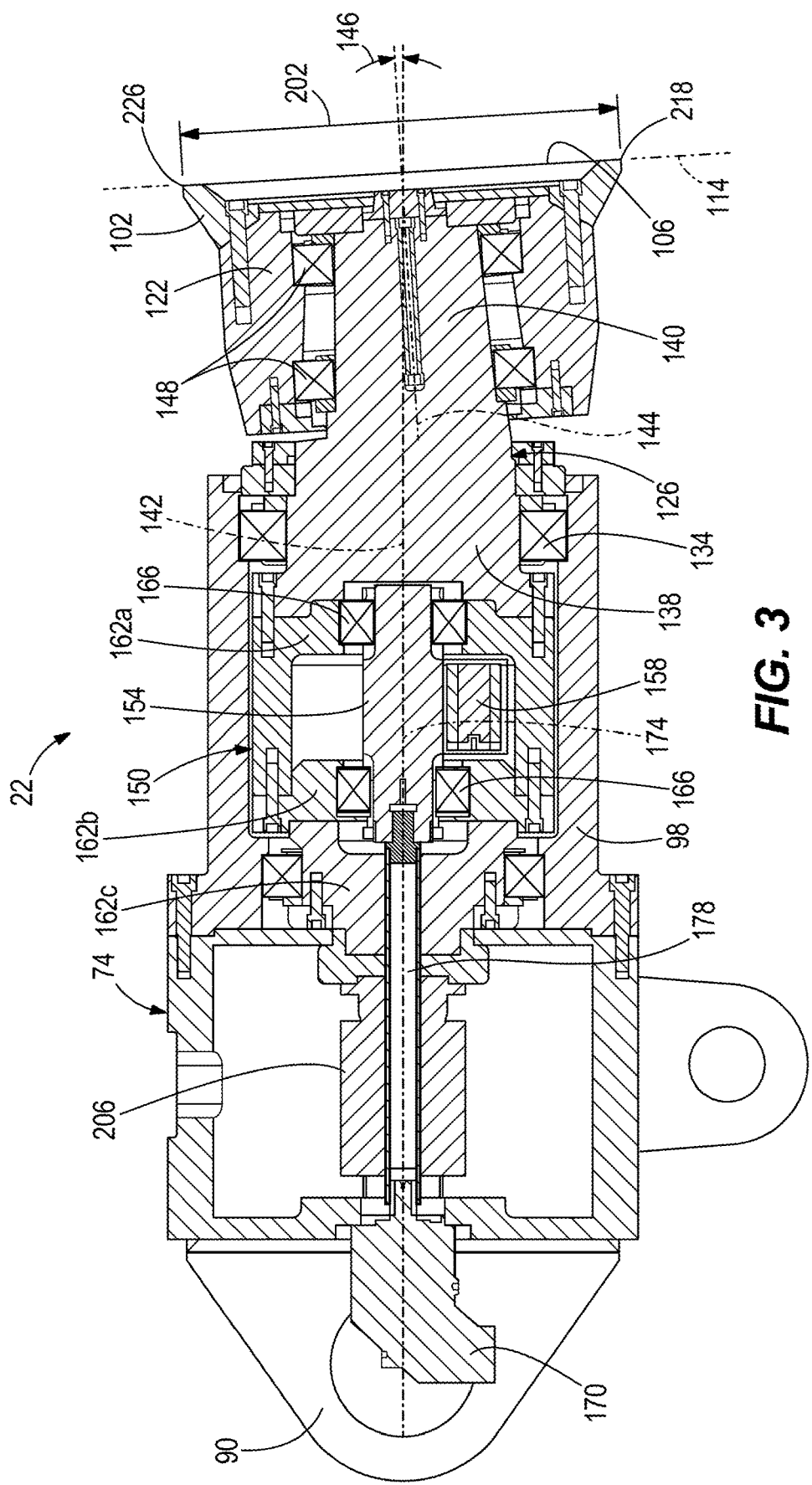
FIG. 3 is cross-section view of the cutter head of FIG. 2, viewed along section 3-3 illustrated in FIG. 1A.
Figure 4:
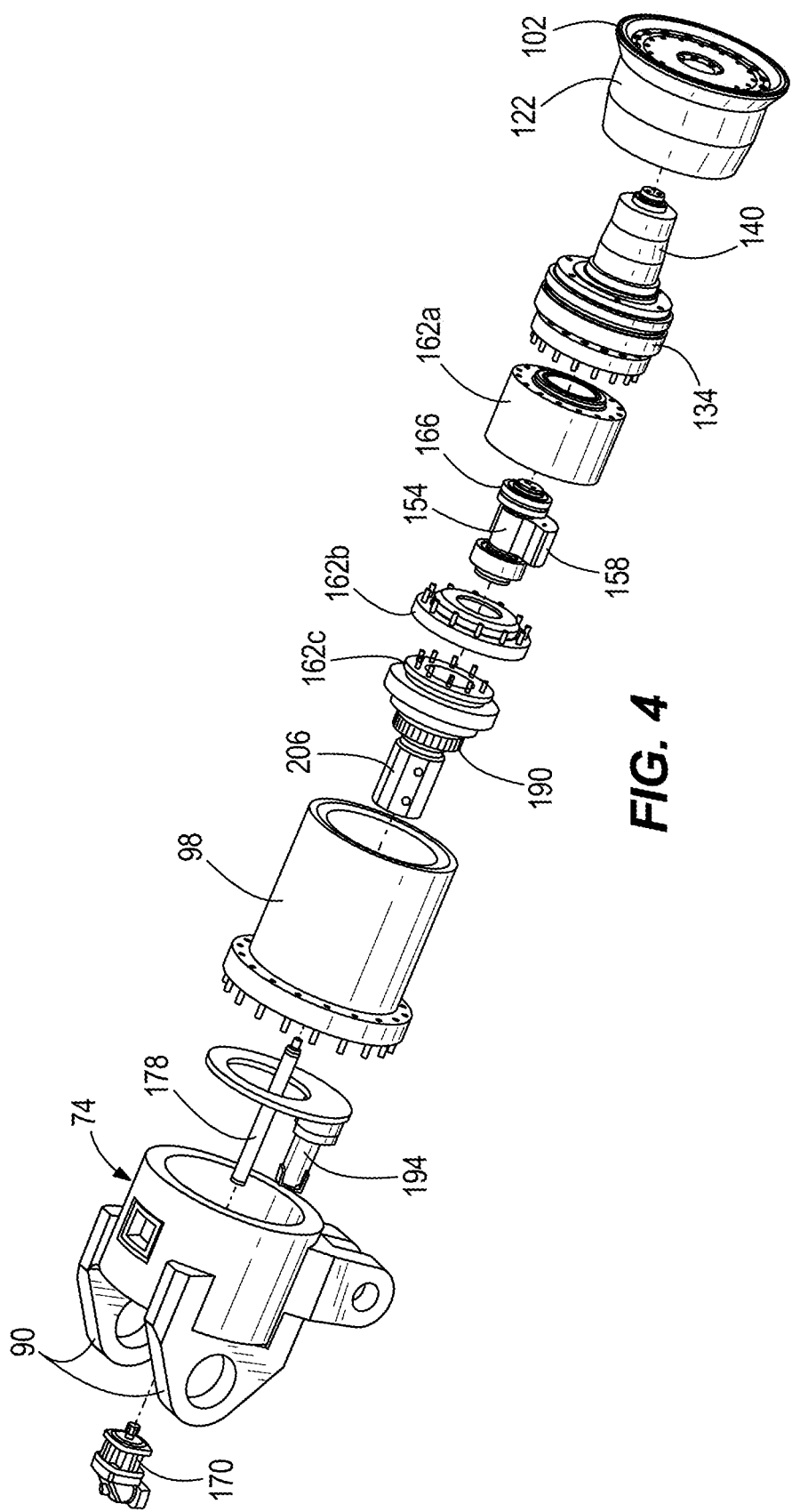
FIG. 4 is an exploded view of the cutter head of FIG. 2.
Figure 5:
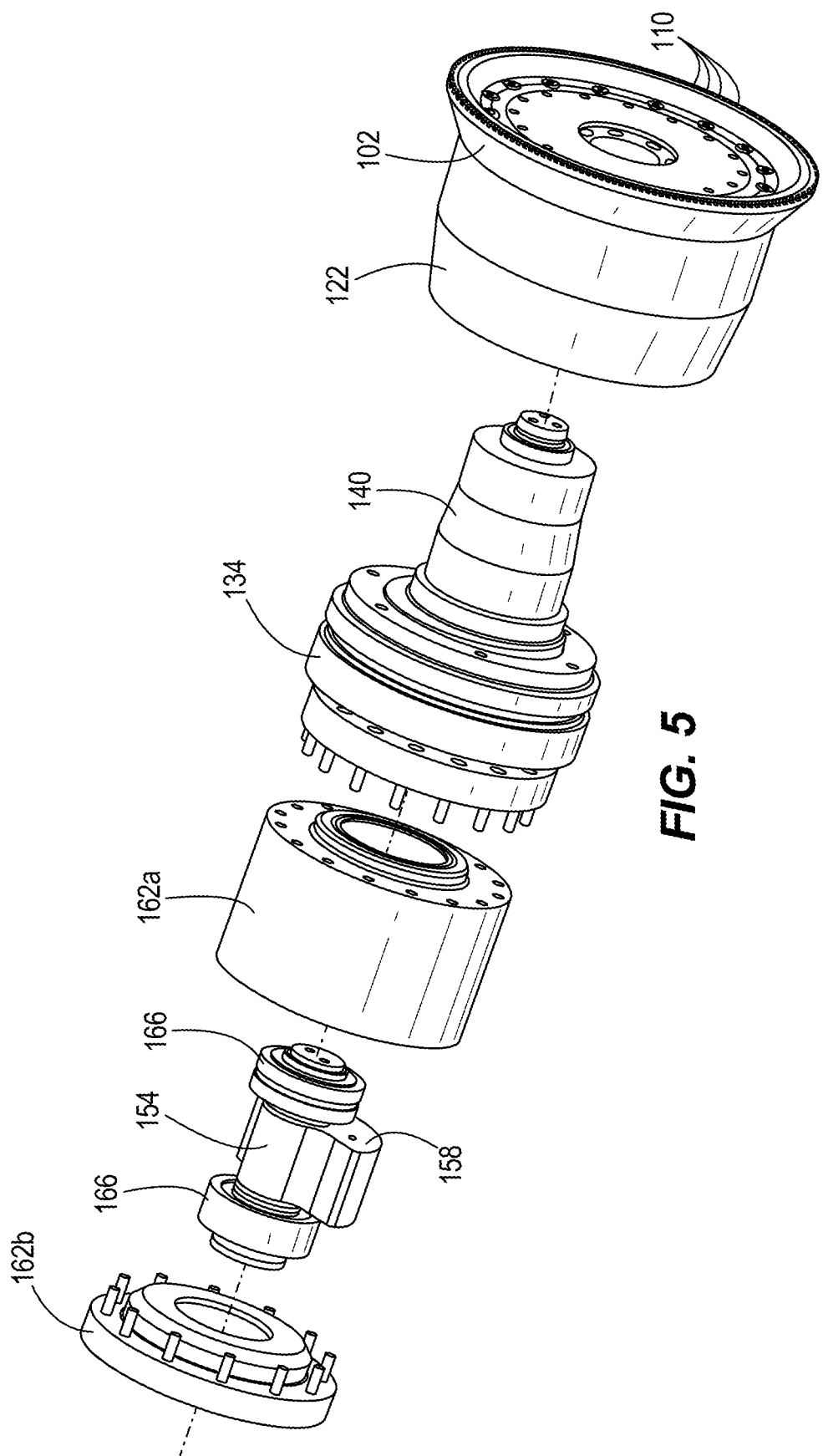
FIG. 5 is an exploded view of a portion of the cutter head of FIG. 4.

As shown in FIG. 2, the cutter head 22 includes a housing 98 supported on an end of the wrist portion 74 and is spaced apart from the intermediate portion 78 (FIG. 1). In the illustrated embodiment, the housing 98 is formed as a separate structure that is removably coupled to the wrist portion 74 (e.g., by fasteners). The cutter head 22 is positioned adjacent a distal end of the boom 18 (FIG. 1). As shown in FIGS. 2 and 3, the cutter head 22 includes a cutting member or bit or cutting disc 102 having a peripheral edge 106, and a plurality of cutting bits 110 are positioned along the peripheral edge 106. The peripheral edge 106 may have a round (e.g., circular) profile with the cutting bits 110 oriented in a common plane or cutting plane 114.

Referring now to FIG. 3, the cutting disc 102 is rigidly coupled to a carrier 122 that is supported on a shaft 126. The shaft 126 includes a first portion 138 and a second portion 140. The first portion 138 is supported for rotation relative to the housing 98 by one or more shaft bearings 134 (e.g., tapered roller bearings), and the first portion 138 rotates about a first axis 142. The second portion 140 of the shaft 126 extends along a second axis 144 that is oblique or non-parallel to the first axis 142. In the illustrated embodiment, the second axis 144 forms an acute angle 146 relative to the first axis 142.

In some embodiments, the angle 146 greater than approximately 0 degrees and less than approximately 25 degrees. In some embodiments, the angle 146 is between approximately 1 degree and approximately 15 degrees. In some embodiments, the angle 146 is between approximately 1 degree and approximately 10 degrees. In some embodiments, the angle 146 is between approximately 1 degree and approximately 7 degrees. In some embodiments, the angle 146 is approximately 3 degrees.

The second portion 140 supports the carrier 122 and the cutting disc 102 for rotation about the second axis 144. In particular, the carrier 122 is supported for rotation relative to the shaft 126 by carrier bearings 148 (e.g., tapered roller bearings). In the illustrated embodiment, the second axis 144 represents a cutting axis about which the cutting disc 102 rotates, and the second axis 144 is perpendicular to the cutting plane 114. Also, in the illustrated embodiment, the second axis 144 intersects the first axis 142 at the center of the forward face of the cutting disc 102, or at the center of the cutting plane 114 defined by the cutting bits 110.

An excitation element 150 is positioned in the housing 98 adjacent the first portion 138 of the shaft 126. The excitation element 150 includes an exciter shaft 154 and an eccentric mass 158 positioned on the exciter shaft 154. The exciter shaft 154 and the eccentric mass 158 may be supported in an exciter case 162. The exciter shaft 154 is supported for rotation relative to the exciter case 162 by exciter bearings 166 (e.g., roller bearings, such as spherical roller bearings, compact aligning roller bearings, and/or toroidal roller bearings). The exciter shaft 154 is coupled to an exciter motor 170 and the exciter shaft 154 is driven to rotate about an exciter axis 174. The eccentric mass 158 is offset from the exciter axis 174. In the illustrated embodiment, the exciter axis 174 is aligned with the first axis 142. In other embodiments, the exciter axis 174 may be oriented parallel to and offset from the first axis 142. In still other embodiments, the exciter axis 174 may be inclined or oriented at an oblique angle relative to the first axis 142. The exciter axis 174 may also be positioned both offset and inclined relative to the first axis 142.

In the illustrated embodiment, the exciter motor 170 is supported on the wrist portion 74, and the exciter shaft 154 is connected to an output shaft of the exciter motor 170 by a coupler 178 extending between an end of the exciter shaft 154 and the exciter motor 170. Also, in the illustrated embodiment, the exciter case 162 includes multiple sections (162a, 162b, 162c) secured to one another and secured to the shaft 126. That is, the exciter case 162 rotates with the shaft 126 and is supported for rotation relative to the housing 98. In other embodiments, the exciter case 162 may be formed integrally with the shaft 126.

The rotation of the eccentric mass 158 about the exciter axis 174 induces an eccentric oscillation in the housing 98, the shaft 126, the carrier 122, and the cutting disc 102. In some embodiments, the excitation element 150 and cutter head 22 are similar to the exciter member and cutting bit described in U.S. Publication No. 2014/0077578, published Mar. 20, 2014, the entire contents of which are hereby incorporated by reference. In the illustrated embodiment, the carrier 122 and the cutting disc 102 are freely rotatable relative to the shaft 126; that is, the cutting disc 102 is neither prevented from rotating nor positively driven to rotate, except by the induced oscillation caused by the excitation element 150 and/or by the reaction forces exerted on the cutting disc 102 by the rock face 30. In other embodiments in which the exciter axis 174 is offset and/or inclined relative to the first axis 142, the rotation of the eccentric mass 158 would cause both excitation or oscillation in both a radial direction (perpendicular to the first axis 142) and an axial direction (parallel to the first axis 142).

In the aligned boom configuration described above with respect to FIG. 1E, the exciter axis 174 may be aligned to extend through the wrist axis 94 and the first pivot axis 82. The cutting disc 102 may provide clearance relative to the rock face 30 whether the boom 18 is pivoted about the first pivot axis 82 in the aligned configuration, or if the base portion 70 is locked and the wrist portion 74 is pivoted.

Figure 6:
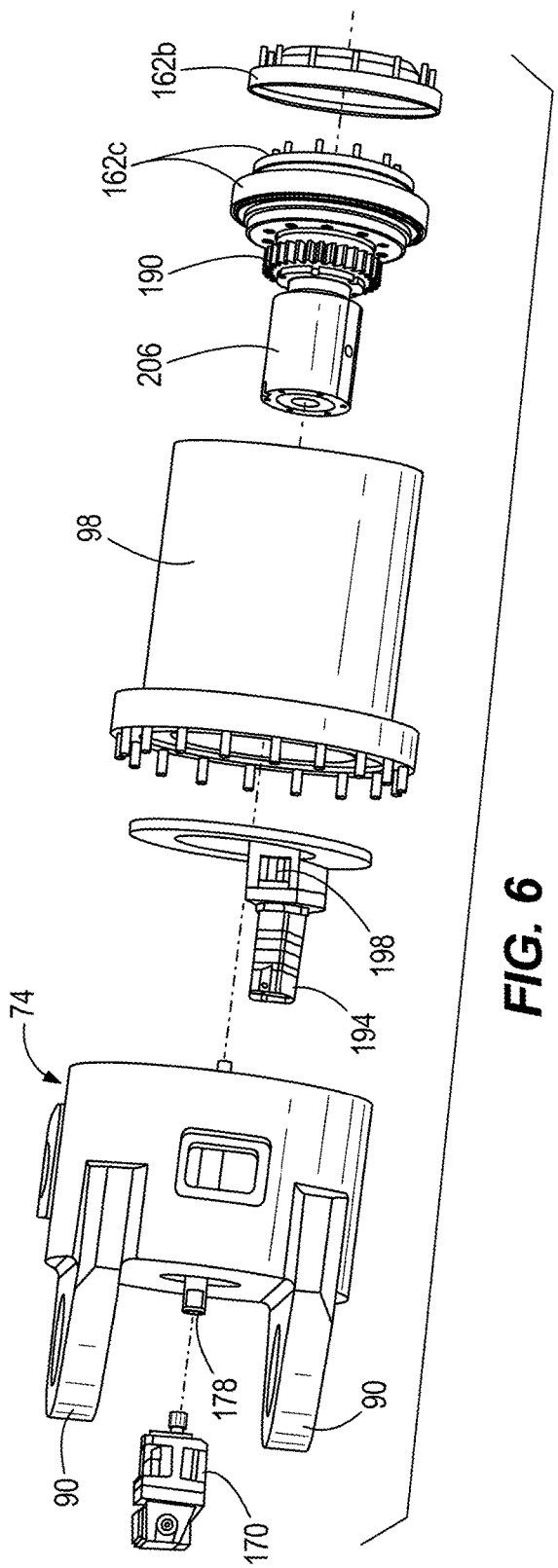
FIG. 6 is an exploded view of a portion of the cutter head of FIG. 2.
Figure 7:
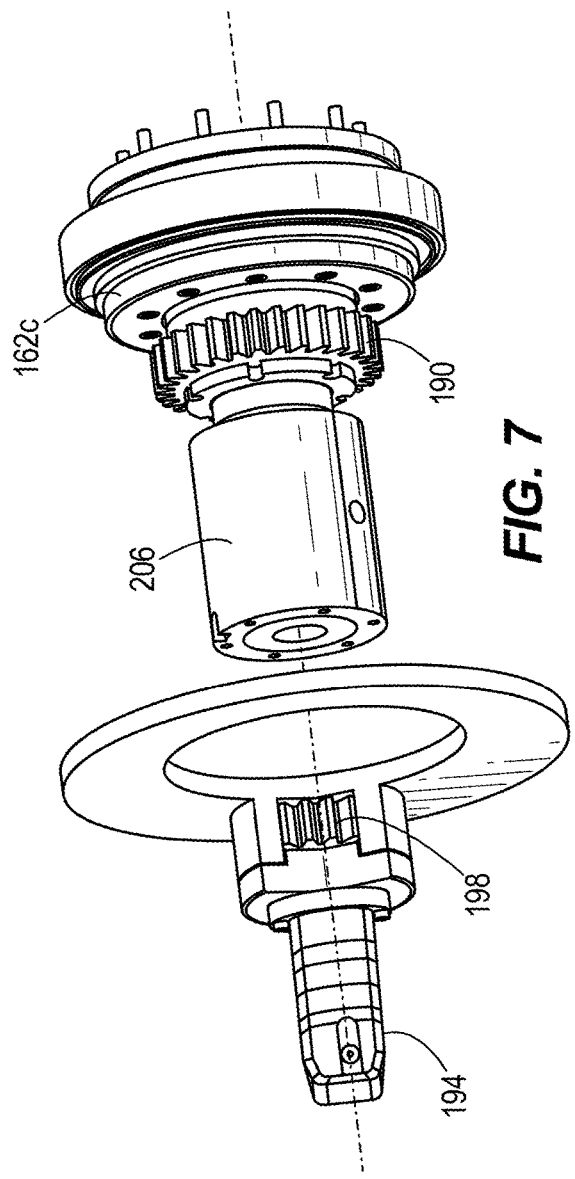
FIG. 7 is an exploded view of a portion of the cutter head of FIG. 6.

Referring to FIGS. 6 and 7, an end of the exciter case 162 is secured to a gear surface 190 (e.g., a spur gear, a toothed belt, etc.). In addition, the cutter head 22 includes a second motor 194 supported adjacent the end of the exciter case 162. The second motor 194 includes an output shaft (not shown) coupled to a pinion 198 that meshes with or engages the gear surface 190. Operation of the second motor 194 drives the pinion 198, thereby rotating the gear surface 190. The rotation of the gear surface 190 rotates the exciter case 162 and the shaft 126 about the first axis 142. As a result, the second portion 140 of the shaft 126 also rotates, thereby changing the orientation of the second axis 144 about which the cutting disc 102 rotates. For example, the cutting disc 102 in FIG. 3 is oriented for cutting in a downward direction; to adjust the cutter clearance to change the cutting direction (e.g., to an upward direction), the shaft 126 may be rotated 180 degrees.

In the illustrated embodiment, the second axis 144 intersects the first axis 142 at the center of the forward face of the cutting disc 102 (i.e., the center of the cutting plane 114 defined by the peripheral edge 106 in the illustrated embodiment), or very close to the center of the plane 114. As a result, the center of the cutting disc 102 remains in a fixed (or nearly fixed) relative position as the shaft 126 rotates, avoiding translation of the cutting disc 102 as the shaft 126 is rotated. In other embodiments, a small offset between the axes 142, 144 could exist.

Also, in the illustrated embodiment, the cutter head 22 includes a rotary union or fluid swivel 206 for providing fluid communication between a fluid source and the components in the cutter head 22. The swivel 206 may transmit various types of fluids, including lubricant, hydraulic fluid, water, or another medium for flushing cut rock and/or cooling the cutting disc 102. In some embodiments, the swivel 206 is positioned between the exciter motor 170 and the exciter shaft 154, and the coupler 178 extends through the swivel 206. In other embodiments, the components may be positioned in a different manner.

Figure 8:
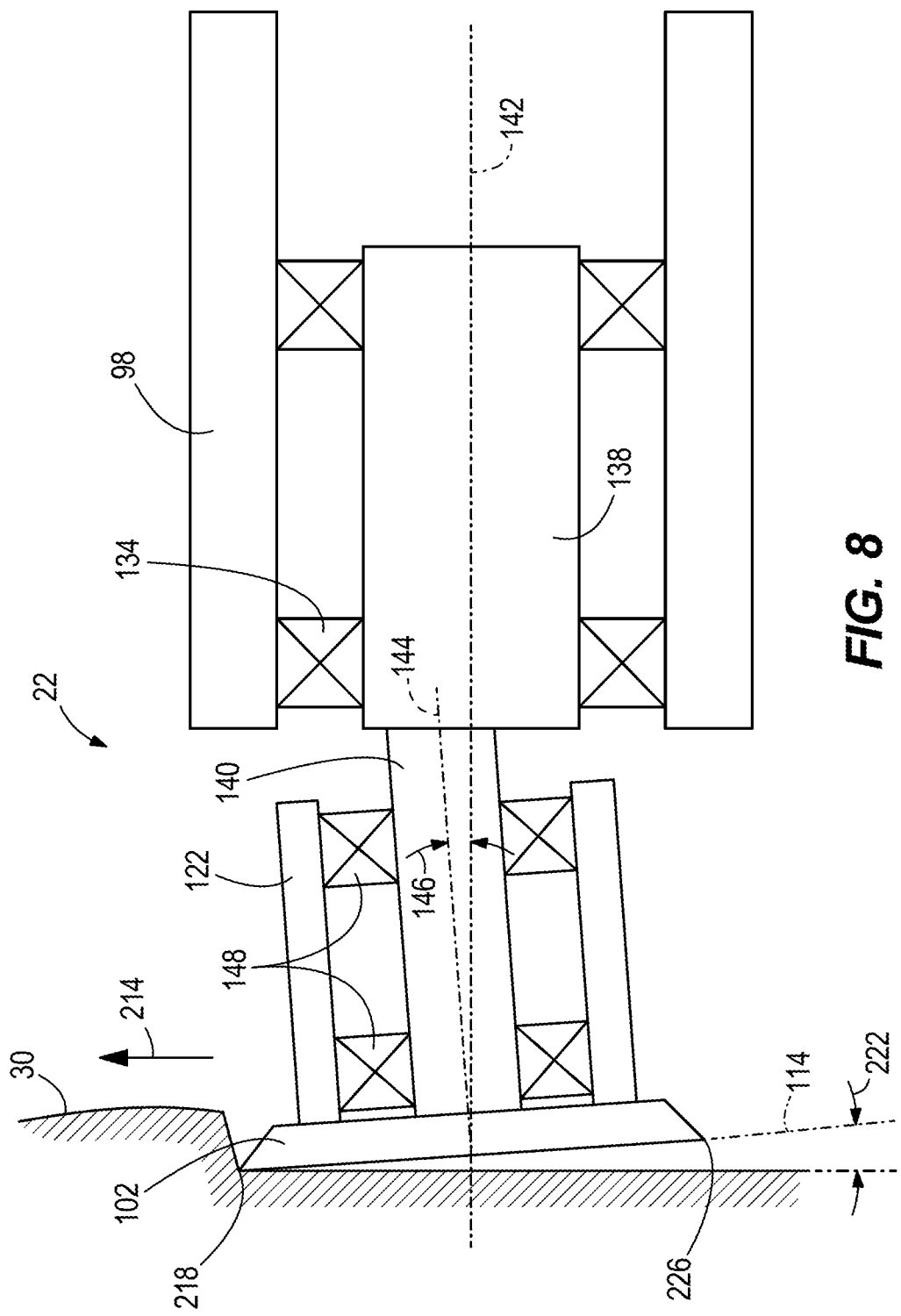
FIG. 8 is a schematic view of the cutter head of FIG. 2 engaging a rock face.

FIG. 8 illustrates a schematic view of the cutter head 22 engaging the rock face 30 in an undercutting manner. The cutting disc 102 traverses across a length of the rock face 30 in a cutting direction 214. A leading portion 218 of the cutting disc 102 contacts the rock face 30 at a contact point. The cutting plane 114, which is oriented perpendicular to the second axis 144, generally forms an acute angle 222 relative to a tangent of the rock face 30 such that a trailing portion 226 of the cutting disc 102 (i.e., a portion of the disc that is positioned behind the leading portion 218 with respect to the cutting direction 214) is spaced away from the rock face 30. The angle 222 provides clearance between the rock face 30 and the trailing portion 226.

By rotating the shaft 126, an operator can modify the orientation of the second axis 144 and therefore the orientation of the cutting disc 102. A plane (e.g., the plane of the cross-section of FIG. 3) containing both the first axis 142 and the second axis 144 also contains a width or diameter 202 of the peripheral edge 106. The diameter 202 extends between the point on the cutting disc 102 that is closest to the face 30 relative to the first axis 142 (i.e., the leading portion 218) and the point on the cutting disc 102 that is furthest from the face 30 relative to the first axis 142 (i.e., the trailing portion 226). To cut in a desired direction, the operator rotates the shaft 126 such that the plane containing the first axis 142 and second axis 144 is aligned with the desired cutting direction.

The cutter head 22 is omni-directional, being capable of efficiently cutting in any direction and changing the cutting direction. A controller may coordinate the translation of the cutting disc 102 across the face 30 and the rotation of the second portion 140 of the shaft 126 during cutting direction changes to prevent axial interference between the cutting disc 102 and the face 30. In addition, the structure of the boom 18 with multiple pivot axes is compact and versatile, simplifying the suspension and control of the wrist portion 74 and reducing the frequency with which the position and orientation of the cutter head 22 must be re-configured.

Although the intersection of the first axis 142 and the second axis 144 has been described above as being located at a center of the cutting plane 114, it is possible that the intersection of the axes 142, 144 may be offset by a small distance from the cutting plane 114. In such a condition, the center of the cutting plane 114 will move as the shaft 126 is rotated, resulting in a small translation of the cutting disc 102. The cutting disc 102 may still cut rock in such a condition, and the cutting characteristics can change depending on the offset distance between the intersection point and the cutting plane 114, and the characteristics of the rock to be cut (e.g., specific energy, or the energy required to excavate a unit volume of rock).

Figure 9:
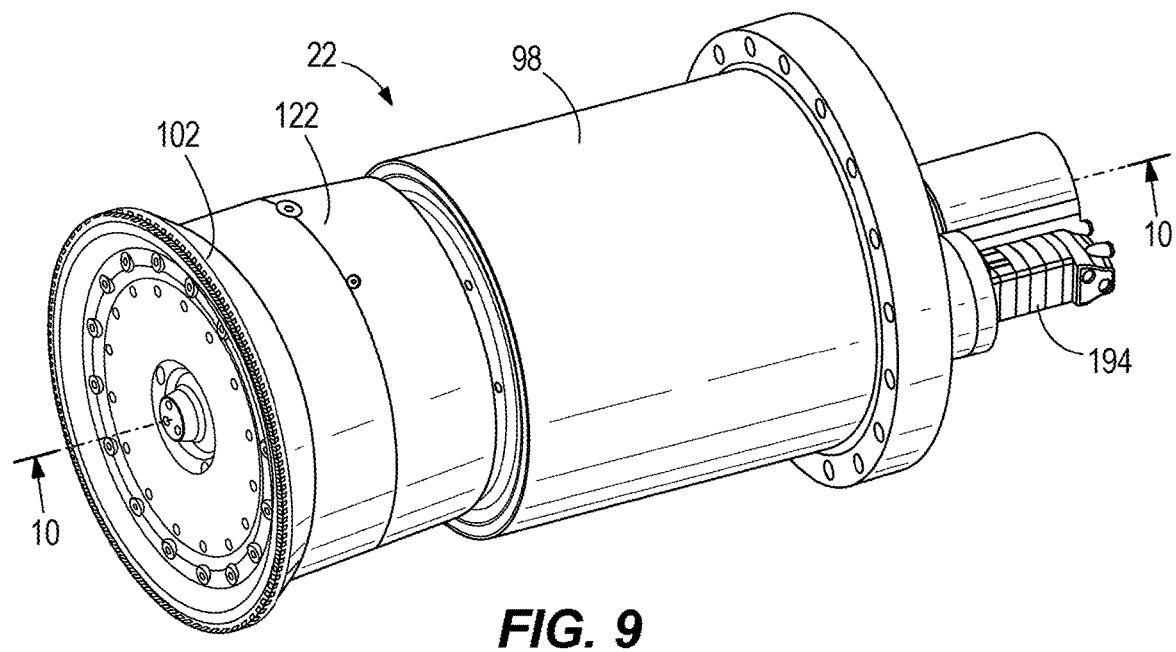
FIG. 9 is a perspective view of a cutter head according to another embodiment.
Figure 10:
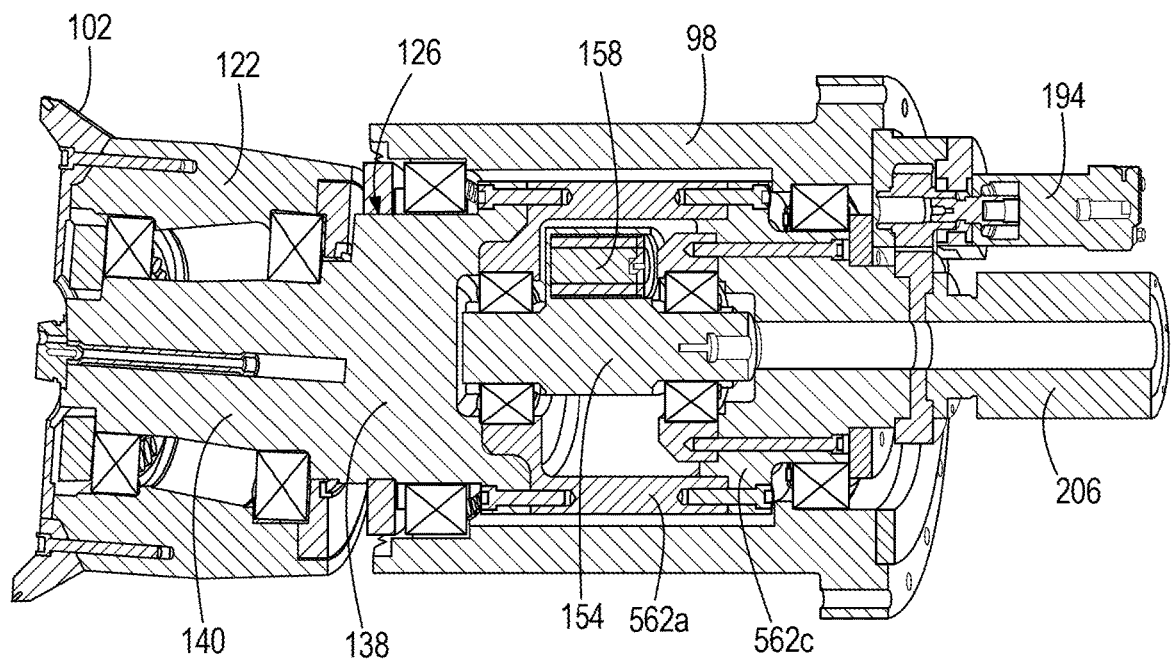
FIG. 10 is a cross-section view of the cutter head of FIG. 9, viewed along section 10-10.
Figure 11:
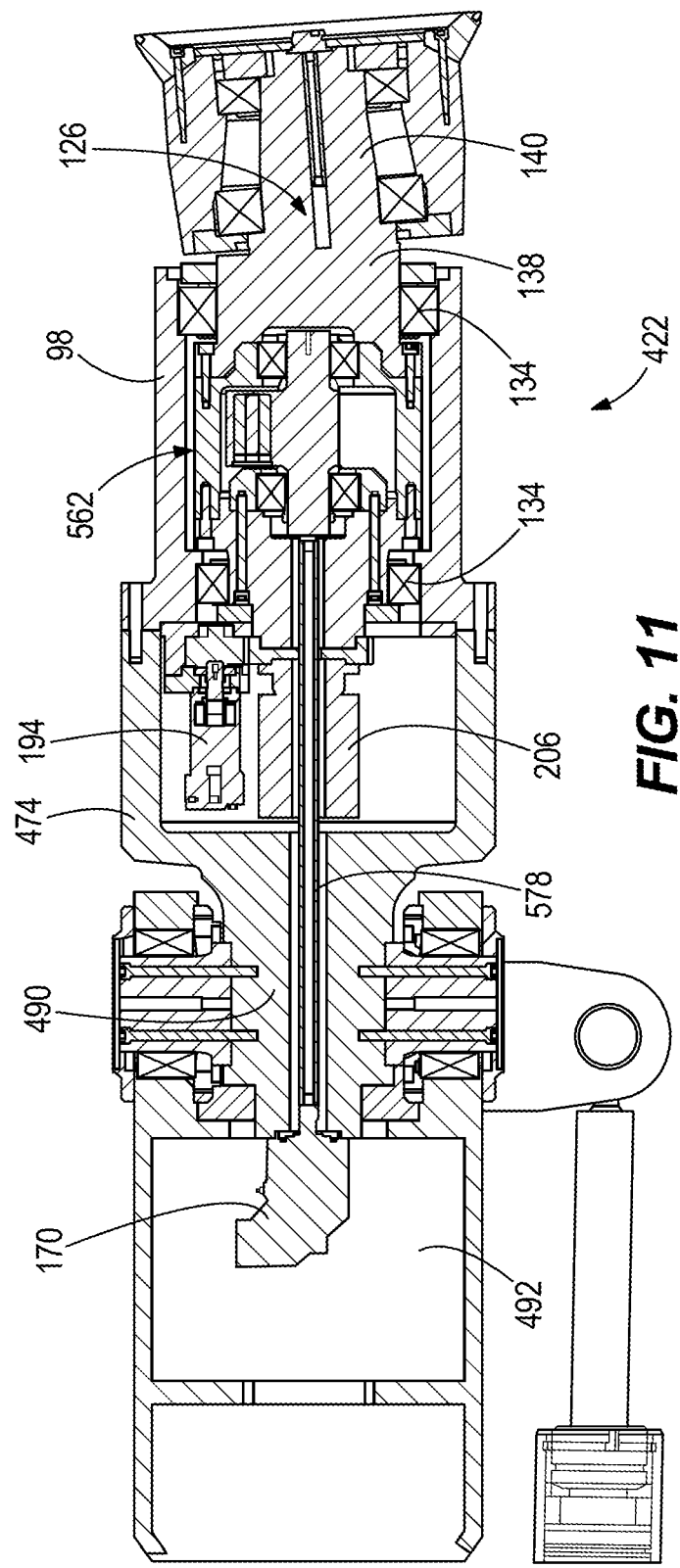
FIG. 11 is a side cross-section view of the cutter head of FIG. 9 and a boom according to one embodiment.

FIGS. 9 and 10 illustrate the cutter head 22 separate from the boom. As shown in FIG. 10, the exciter case 562 may have a different shape and construction from the exciter case 162 described above with respect to FIG. 3. In addition, FIG. 11 illustrates the cutter head 422 coupled to a wrist portion 474 according to another embodiment. Rather than lugs, the wrist portion 474 includes a shaft 490 that is supported for pivoting movement relative to stationary section 492. The coupler 574 is longer than the coupler 174 described above with respect to FIG. 3 in order to accommodate the additional distance between the exciter motor 170 and the exciter shaft 154.

Figure 12:
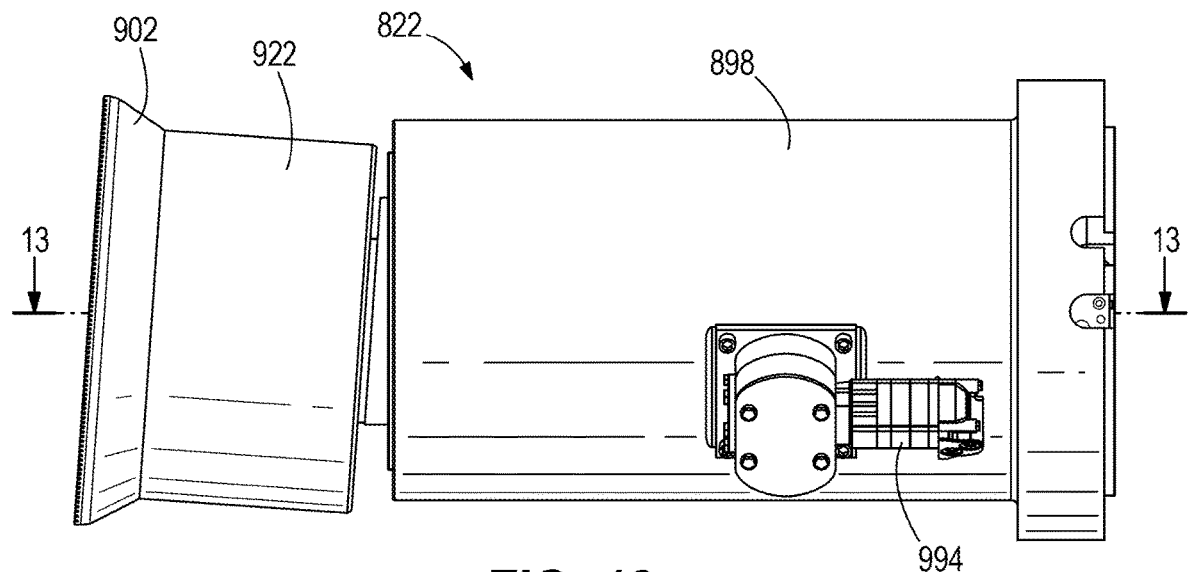
FIG. 12 is a perspective view of a cutter head according to another embodiment.
Figure 13:
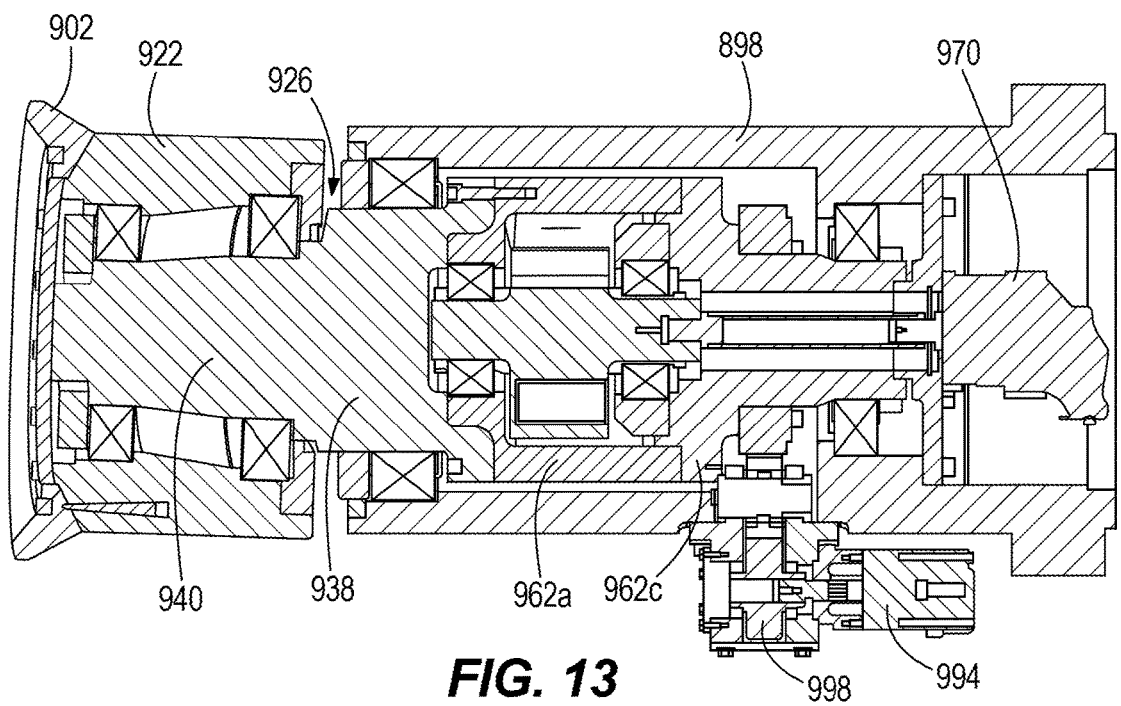
FIG. 13 is a side cross-section view of the cutter head of FIG. 12, viewed along section 13-13.

FIGS. 12 and 13 illustrate a cutter head 822 according to yet another embodiment. Many aspects of the cutter head 822 are similar to the cutter head 22, and similar features are identified with similar reference numbers, plus 800. cutter head 822 includes an exciter motor 970 that is supported on the housing 898 rather than supported on a portion of a boom. In addition, the second motor 994 is positioned outside the housing 898 instead of being positioned adjacent an end of the housing 898.

Figure 14:
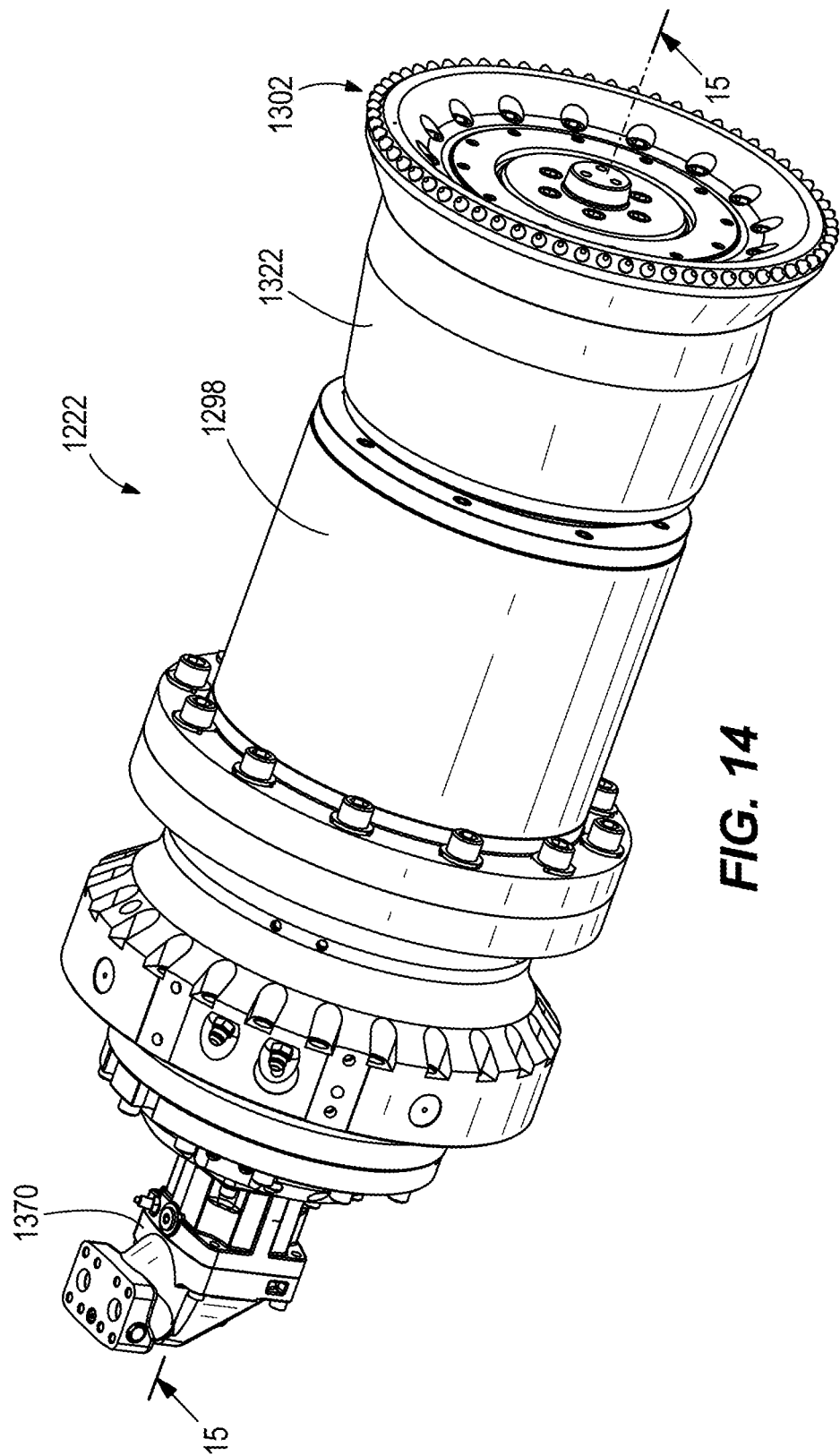
FIG. 14 is a perspective view of a cutter head according to another embodiment.
Figure 15:
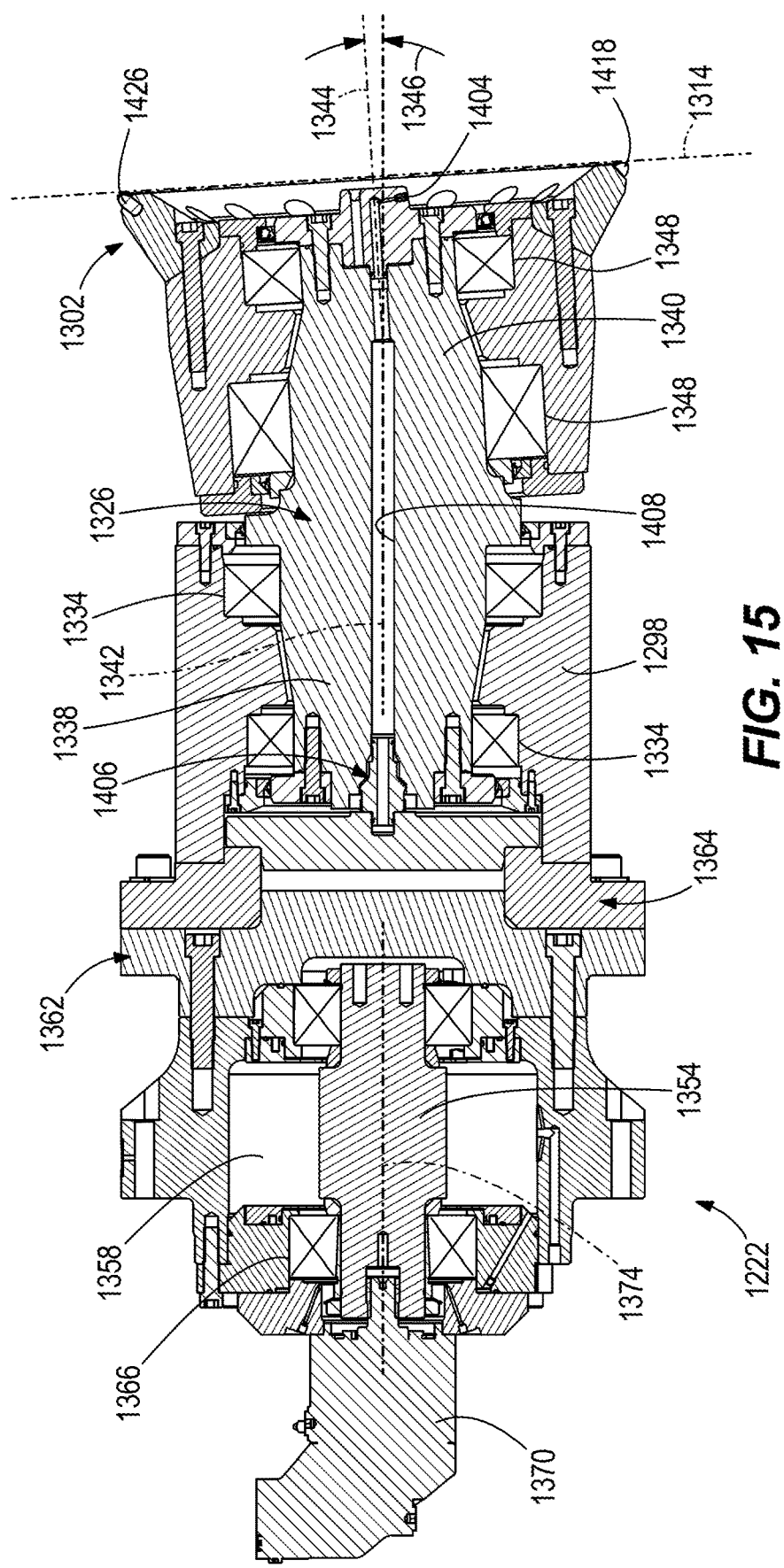
FIG. 15 is a side cross-section view of the cutter head of FIG. 12, viewed along section 15-15.

FIGS. 14 and 15 illustrate a cutter head 1222 according to still another embodiment. Many aspects of the cutter head 1222 are similar to the cutter head 22, and similar features are identified with similar reference numbers, plus 1200.

As shown in FIG. 15, the cutter head 1222 includes a single motor 1370 for driving an exciter shaft 1354 to rotate an eccentric mass 1358 about an exciter axis 1374. In cutter head 1222 further includes a shaft 1326 supporting a cutting disc 1302. In particular, the shaft 1326 includes a first portion 1338 and a second portion 1340. The first portion 1338 is supported for rotation (e.g., by shaft bearings 1334) relative to a housing 1298. The first portion 1338 extends along a first axis 1342, and the second portion 1340 extends along a second axis 1344 that is oblique or non-parallel relative to the first axis 1342. In the illustrated embodiment, the second axis 1344 forms an acute angle 1346 relative to the first axis 1342. The cutting disc 1302 is coupled to a carrier 1322 that is supported for rotation on the second portion 1340. In the illustrated embodiment, the carrier 1322 is not directly driven to rotate but is supported for free rotation relative to the second portion 1340 (e.g., by carrier bearings 1348).

In the illustrated embodiment, the housing 1298 may be coupled to an exciter case 1362 (e.g., by an adaptor plate 1364), but the first portion 1338 of the shaft 1326 (e.g., a first end or proximate end of the shaft 1326) is not directly secured for rotation with the exciter case 1362. The shaft 1326 is not directly driven to rotate but instead is supported for free rotation relative to the housing 1298 and relative to the exciter case 1362. In the illustrated embodiment, the shaft 1326 rotates about an axis (e.g., the first axis 1342) that is concentric with the exciter axis 1374. In other embodiments, the axis of rotation of the shaft 1326 may be offset and/or inclined relative to the exciter axis 1374. Also, in the illustrated embodiment, the combined center of gravity of the second portion 1340 of the shaft 1326 and the components supported thereon (e.g., the cutting disc 1302, the carrier 1322, the carrier bearings 1348, etc.) lie on an axis that is concentric with the first axis 1342.

Figure 16:
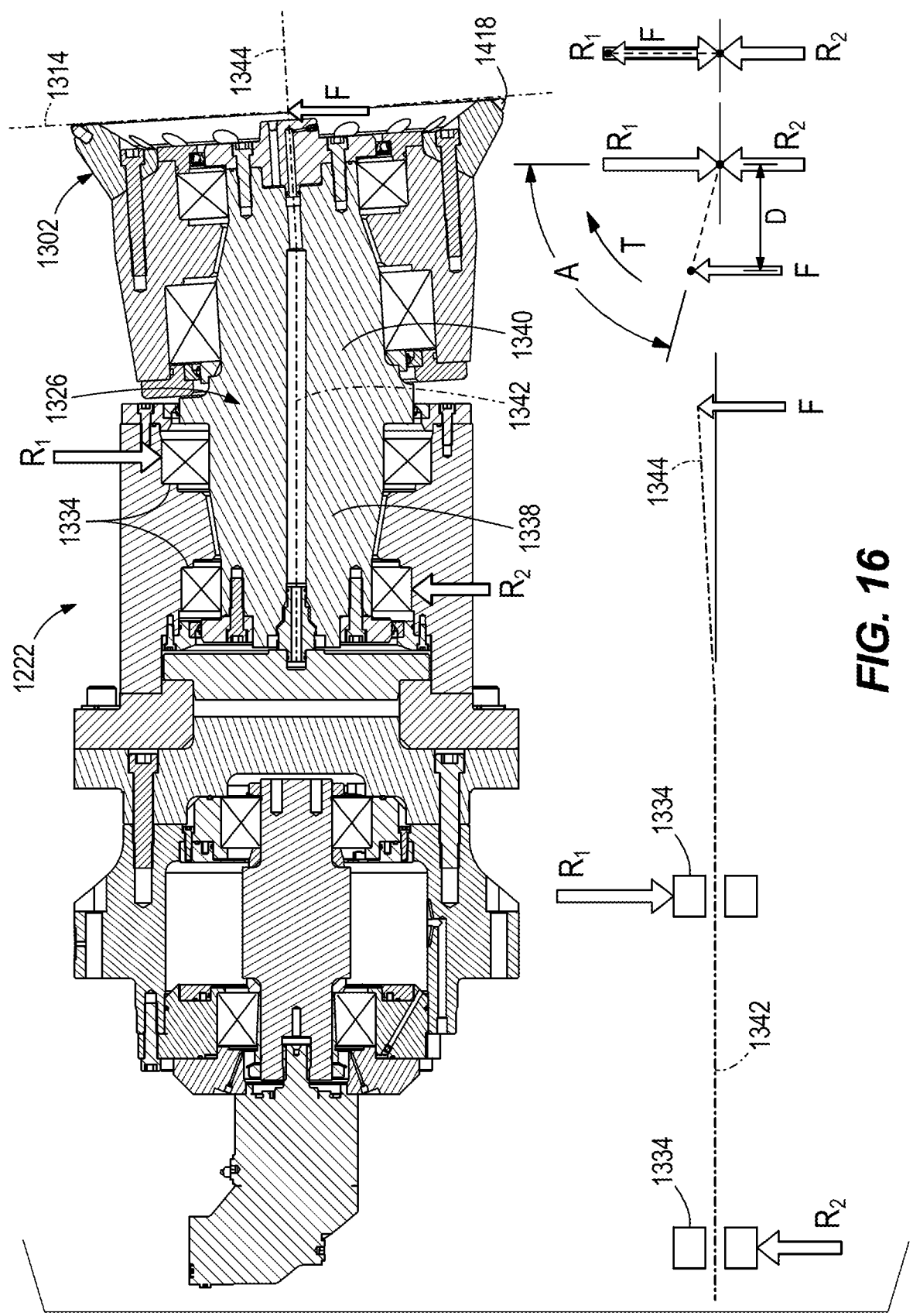
FIG. 16 is a side cross-section view of the cutter head of FIG. 12, viewed along section 15-15.

The cutter head 1222 does not include a second motor for driving rotation of the shaft 1326. The portion of the shaft 1326 supporting the cutting disc 1302 (i.e., the second portion 1340) is oblique or non-parallel relative to the first portion 1338. As shown in FIG. 16, because the cutting disc 1302 is free to rotate about the second axis 1344, a radial component of the cutting reaction force F acts on the second portion 1340 at the point where the second axis 1344 intersects a cutting plane 1314 of the disc 1302. As a result, any radial load applied to the cutting disc 1302, such as the reaction forces caused by the impact of the cutting disc 1302 against a rock formation, will create a moment on the shaft 1326 and cause the shaft 1326 to rotate about the first axis 1342 so that the second portion 1340 is oriented away from the applied force. The magnitude of the moment is equal to the radial component of the cutting force F multiplied by a distance D between the line of action of the cutting force F (i.e., the intersection of the second axis 1344 with the cutting plane 1314) and the intersection of the first axis 1342 with the cutting plane 1314. The product of the radial component and the distance D creates a steering torque T. The leading portion 1418 of the cutting disc 1302 (i.e., the portion of the disc 1302 that protrudes the furthest in a direction parallel to the first axis 1342) is therefore automatically oriented to engage the rock, even if the direction of travel of the cutter head 1222 is changed. It is understood that the radial component of the reaction force may not be precisely aligned with the travel direction at all times, but the two will be substantially aligned. It is also possible that the shaft bearings 1334 may generate some friction to resist small changes in the direction of travel. The shaft bearings 1334 also exert reaction forces R1, R2 on the shaft 1326 in response to the cutting force F.

Referring again to FIG. 15, the cutter head 1222 further includes one or more spray nozzles 1404, a fluid swivel 1406, and a fluid passage 1408 extending through the shaft 1326. In the illustrated embodiment, the fluid swivel 1406 receives a spray fluid, such as water, from a fluid source (e.g., a pump—not shown). The fluid passage 1408 provides fluid communication between the swivel 1406 and the spray nozzle 1404 positioned on the shaft 1326 adjacent the cutting disc 1302. Pressurized fluid is sprayed from the nozzle 1404. In the illustrated embodiment, the nozzle 1404 is secured to an end of the shaft 1326 and oriented toward the leading portion 1418 of the disc 1302. As the shaft 1326 rotates, the nozzle 1404 will maintain its orientation to emit fluid toward the direction of impact.

The cutter head 1222 avoids the need for a second motor and the accompanying hydraulic components, and also includes simple mechanical components to achieve a "steering" function. In addition, a smaller diameter cutting disc 1302 can be used, and the control of the boom (FIG. 1) supporting the cutter head 1222 is less complex.

Although cutting devices have been described above with respect to a mining machine (e.g., an entry development machine), it is understood that one or more independent aspects of the cutting devices and/or other components may be incorporated into another type of machine and/or may be supported on a boom of another type of machine. Examples of other types of machines may include (but are not limited to) drills, road headers, tunneling or boring machines, continuous mining machines, longwall mining machines, and excavators.

Although various aspects have been described in detail with reference to certain embodiments, variations and modifications exist within the scope and spirit of one or more independent aspects as described. Various features and advantages are set forth in the following claims.

What is claimed is:

1. A machine for excavating rock, the machine comprising:
    a chassis including at least one traction drive device;
    a boom supported by the chassis;
    a cutting device supported by the boom, the cutting device including a cutting disc having a cutting edge, the cutting disc rotatable about a cutting device axis;
    a first stabilizer for supporting the chassis relative to a mine surface, the first stabilizer including a first pad, a first actuator, and a first support member, the first pad configured to engage the mine surface, the first actuator including a first end coupled to the chassis and a second end coupled to the first pad, the first support member including a first end coupled to the chassis and a second end coupled to at least one of the first pad and the first actuator;
    a second stabilizer for supporting the chassis relative to the mine surface and operable independent of the first stabilizer, the second stabilizer including a second pad, a second actuator, and a second support member, the second pad configured to engage the mine surface, the second actuator including a first end coupled to the chassis and a second end coupled to the second pad, the second support member including a first end coupled to the chassis and a second end coupled to at least one of the second pad and the second actuator; and
    a cross-member coupled between the first stabilizer and the second stabilizer.

2. The machine of claim 1, wherein the boom includes a first portion and a second portion, the first portion rotatable about a first pivot axis between a raised position and a lowered position, the second portion coupled to the cutting device, the second portion pivotable about a second pivot axis between a raised position and a lowered position.

3. The machine of claim 1, further comprising a plurality of jacks coupled to the chassis, each of the jacks including a pad that is extendable to engage a support surface and lift the chassis away from the support surface to remove loading on the traction drive device, wherein each stabilizer is oriented to extend in a direction opposite the jacks to engage a roof surface.

4. The machine of claim 3, wherein each support member includes a telescoping link that is extendable and retractable as the associated actuator is extended and retracted.

5. The machine of claim 1, wherein the second end of each support member is pivotably coupled to both the associated pad and the second end of the associated actuator, and the first end of each support member is spaced apart from the first end of the associated actuator.

6. The machine of claim 1, further comprising a sumping frame coupled to the chassis and supported for movement in a direction parallel to a longitudinal axis of the chassis.

7. The machine of claim 6, further comprising a material handling device secured to the sumping frame and including a conveyor and a shovel, the shovel receiving cut material from a space forward of the frame with respect to a direction of advance, the shovel directing the cut material toward the conveyor.

8. The machine of claim 1, wherein a first end of the boom is supported by a slew coupling pivotable about an axis to move the boom in a lateral direction.

9. The machine of claim 1, wherein a portion of each support member includes a torsionally flexible member.

10. The machine of claim 1, wherein the cross-member is telescoping.

11. The machine of claim 1, wherein an end of the cross-member is coupled to the first pad by a spherical coupling, and another end of the cross-member is coupled to the second pad by a spherical coupling.

12. The machine of claim 11, wherein the second end of the first support member is coupled to the first pad by a spherical coupling, wherein the second end of the second support member is coupled to the second pad by a spherical coupling.

13. The machine of claim 1, wherein the second end of the first support member is coupled to the first pad by a spherical coupling, wherein the second end of the second support member is coupled to the second pad by a spherical coupling.

* * * * *